United States Patent
Kim et al.

(10) Patent No.: US 9,281,930 B2
(45) Date of Patent: Mar. 8, 2016

(54) METHOD FOR TRANSMITTING/RECEIVING DATA IN WIRELESS ACCESS SYSTEM AND BASE STATION FOR SAME

(75) Inventors: Jinmin Kim, Anyang-si (KR); Seunghee Han, Anyang-si (KR); Hyunwoo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 119 days.

(21) Appl. No.: 14/111,986

(22) PCT Filed: May 2, 2012

(86) PCT No.: PCT/KR2012/003427
§ 371 (c)(1),
(2), (4) Date: Oct. 15, 2013

(87) PCT Pub. No.: WO2012/150807
PCT Pub. Date: Nov. 8, 2012

(65) Prior Publication Data
US 2014/0029490 A1    Jan. 30, 2014

Related U.S. Application Data

(60) Provisional application No. 61/481,254, filed on May 2, 2011.

(51) Int. Cl.
H04L 5/00 (2006.01)
H04L 5/14 (2006.01)
(Continued)

(52) U.S. Cl.
CPC ............ H04L 5/0073 (2013.01); H04L 5/1469 (2013.01); H04W 72/1289 (2013.01);
(Continued)

(58) Field of Classification Search
CPC ..... H04L 1/1861; H04L 5/001; H04L 5/0035; H04L 5/0053; H04L 5/0073; H04L 5/0094; H04L 5/1469; H04W 72/1289
USPC ......................................... 370/276, 277, 280
See application file for complete search history.

(56) References Cited

U.S. PATENT DOCUMENTS

2011/0269442 A1* 11/2011 Han et al. ........................ 455/418
2012/0257554 A1* 10/2012 Kim et al. ....................... 370/280
(Continued)

FOREIGN PATENT DOCUMENTS

KR    10-2008-0085653 A    9/2008
KR    10-2011-0036482 A    4/2011
WO    2010050754 A2    5/2010

OTHER PUBLICATIONS

Renesas Electronics Europe: "Operation Principles of CC specific TDD Configuration", 3GPP Draft; R2-111983, 3rd Generation Partnership Project (3GPP), Mobile Competence Centre; 650, Route Des Lucioles; F-06921 Sophia-Antipolis Cedex; France, vol. RAN WG2, no. Shanghai, China; Apr. 11, 2011, Apr. 5, 2011, XP050494505
(Continued)

Primary Examiner — Chi H Pham
Assistant Examiner — Robert Lopata
(74) Attorney, Agent, or Firm — Dentons US LLP

(57) ABSTRACT

In the present invention, a method for transmitting/receiving data in a wireless access system and a base station for same are disclosed. More particularly, the method comprises the following steps: setting a cell group per at least one cell having an identical uplink-downlink configuration, if a plurality of cells are set to a user equipment; performing via a first cell cross-cell scheduling with regard to a second cell, which belongs to a cell group that is different from that including the first cell, according to the uplink-downlink configuration of the first cell; confirming the occurrence of a collision subframe, in which an uplink subframe and a downlink subframe exist simultaneously in the same time interval, in two cells performing the cross-cell scheduling; and transmitting/receiving data with the user equipment when scheduled in the collision subframe due to the cross-cell scheduling, by modifying a transmission position of the uplink or the downlink according to the cross-cell scheduling.

8 Claims, 17 Drawing Sheets

(51) Int. Cl.
*H04W 72/12* (2009.01)
*H04L 1/18* (2006.01)

(52) U.S. Cl.
CPC ............... *H04L1/1861* (2013.01); *H04L 5/001* (2013.01); *H04L 5/0035* (2013.01); *H04L 5/0053* (2013.01); *H04L 5/0094* (2013.01)

(56) References Cited

U.S. PATENT DOCUMENTS

| | | | |
|---|---|---|---|
| 2012/0269179 A1* | 10/2012 | Li et al. | 370/336 |
| 2013/0083707 A1* | 4/2013 | Wang | 370/280 |
| 2013/0114472 A1* | 5/2013 | Tamaki et al. | 370/280 |
| 2013/0272261 A1* | 10/2013 | Seo et al. | 370/329 |
| 2013/0308523 A1* | 11/2013 | Lee et al. | 370/315 |
| 2013/0315135 A1* | 11/2013 | Lee et al. | 370/315 |
| 2014/0029489 A1* | 1/2014 | Han et al. | 370/280 |
| 2014/0044000 A1* | 2/2014 | Charbit et al. | 370/252 |
| 2014/0078941 A1* | 3/2014 | Seo et al. | 370/280 |
| 2014/0161002 A1* | 6/2014 | Gauvreau et al. | 370/280 |

OTHER PUBLICATIONS (CATT: "Consideration on Inter-band Carrier Aggregation for TDD", 3GPP Draft; R2-111833, 3rd Generation Partnership Project (3GPP), Mobile Competence Centre; 650, Route Des Lucioles; F-06921 Sophia-Antipolis Cedex; France, vol. RAN WG2, no. Shanghai, China; Apr. 11, 2011, Apr. 2, 2011, XP050494204.

Huawei: "Improvements on Control Channel for Carrier Aggregation", 3GPP Draft; R1-093048, 3rd Generation Partnership Project (3GPP), Mobile Competence Centre; 650, Route Des Lucioles; F-06921 Sophia-Antipolis Cedex; France, no. Shenzhen, China; Aug. 18, 2009, XP050351440.

Mediatek Inc., "Views on Resource Allocation for PUCCH Format 1b with Channel Selection in Carrier Aggregation," 3GPP TSG-RAN WG1 #63bis, R1-110137, Jan. 17-19, 2011 (Received from the Internet on Nov. 20, 2012: <URL://www.3gpp.org/ftp/tsg_ran/WG1_RL1/TSGR1_63b/Docs/R1-110137.zip>.

* cited by examiner

METHOD FOR TRANSMITTING/RECEIVING DATA IN WIRELESS ACCESS SYSTEM AND BASE STATION FOR SAME

This Application is a 35 U.S.C. §371 National Stage Entry of International Application No. PCT/KR2012/003427, filed May 2, 2012 and claims the benefit of U.S. Provisional Application No. 61/481,254, filed May 2, 2011, all of which are incorporated by reference in their entirety herein.

TECHNICAL FIELD

The present invention relates to a wireless access system, and more particularly, to a method of transmitting and receiving data in a time division duplex (TDD) wireless access system that supports Carrier Aggregation/Multiple Cells, and a device for supporting the method.

BACKGROUND ART

One of most important requirements of a next generation wireless access system is to support high data transmission rate requirements. To this end, various technologies such as multiple input multiple output (MIMO), cooperative multiple point transmission (CoMP), a relay, etc. have been developed.

A conventional wireless access system considers only one carrier although bandwidths in uplink and downlink are set in different ways. For example, there is provided a wireless communication system in which the number of carriers included in each of uplink and downlink is one and bandwidths in uplink and downlink are generally symmetric, based on a single carrier.

However, in order to satisfy relatively high data transmission rate requirements to ensure a widebandwidth in consideration of an actual state in which frequency resources are saturated, the system is designed to satisfy basic requirements for operating independent systems in distributed bands and carrier aggregation (CA)/multiple cells whereby a plurality of bands is bonded to one system has been introduced.

Here, a carrier in a bandwidth unit in which independent operations are available may be referred to as a component carrier (CC). In order to increase transmission capacity, recent 3GPP LTE-A or 802.16m has continuously extended up to 20 MHz or more. In this case, one or more CCs are aggregated to support a wideband. For example, when one CC supports a bandwidth of 5 MHz, 10 MHz, or 20 MHz, a maximum of 5 CCs are bonded to support a system bandwidth up to a maximum of 100 MHz.

When CA technology is used, data can be simultaneously transmitted and received via various uplink/downlink CCs. Thus, a UE may monitor and measure all CCs.

In a time division duplex (TDD) system for supporting this CA environment, respective component carriers may have different uplink-downlink configurations. When cross carrier scheduling between component carries having different uplink-downlink configurations is performed, downlink of one component carrier and uplink of another component carrier may collide with each other and thus problems may arise in terms of data transmission and reception.

DISCLOSURE

Technical Problem

An object of the present invention devised to solve the problem lies in a wireless access system, and preferably, a method of smoothly transmitting and receiving a reference signal between a base station and user equipment in a time division duplex (TDD) wireless access system that supports a carrier aggregation, and a device for the method.

In addition, another object of the present invention devised to solve the problem lies in a method for scheduling transmission time of uplink or downlink data in each component carrier during cross carrier scheduling between different component carriers with different uplink-downlink configurations in a TDD wireless access system for supporting carrier aggregation, and a device for the method.

It is to be understood that both the foregoing general description and the following detailed description of the present invention are exemplary and explanatory and are intended to provide further explanation of the invention as claimed.

Technical Solution

The object of the present invention can be achieved by providing a method of transmitting and receiving data in a time division duplex (TDD) for supporting multiple cells, the method including configuring a cell group including one or more cells with the same uplink-downlink (UL-DL) configuration when a plurality of cell are configured for user equipment, performing cross cell scheduling on a second sell belonging to a different cell group from a first cell via the first cell according to a UL-DL configuration of the first cell, checking whether a collision subframe in which a UL subframe and a DL subframe are simultaneously present occurs in the same time duration in two cells for performing the cross cell scheduling, and changing a transmission position of UL or DL according to the cross cell scheduling and transmitting and receiving data to and from the UE during scheduling in the collision subframe according to the cross cell scheduling.

In another aspect of the present invention, provided herein is a base station (BS) for transmitting and receiving data in a time division duplex (TDD) for supporting multiple cells, the BS including a radio frequency (RF) unit for transmitting and receiving a radio signal, and a processor for configuring a cell group including one or more cells with the same uplink-downlink (UL-DL) configuration when a plurality of cell are configured for user equipment, performing cross cell scheduling on a second sell belonging to a different cell group from a first cell via the first cell according to UL-DL configuration of the first cell, checking whether a collision subframe in which a UL subframe and a DL subframe are simultaneously present occurs in the same time duration in two cells for performing the cross cell scheduling, and changing a transmission position of UL or DL according to the cross cell scheduling and transmitting and receiving data to and from the UE during scheduling in the collision subframe according to the cross cell scheduling.

The transmitting and receiving may include performing the scheduling in the collision subframe according to a UL-DL configuration of the second cell via the second cell.

The transmitting and receiving may include transmitting UL grant information of a physical uplink shared channel (PUSCH) according to the UL-DL configuration of the second cell via the second cell when reception of the PUSCH via the second cell is scheduled in the collision subframe.

The transmitting and receiving may include transmitting UL or DL grant information to the UE via the second cell when transmission of the UL or DL grant information via the first cell is scheduled in the collision subframe.

The number of cell groups configured for the UE may be configured to be equal to or less than the number of inter-bands used in a system or the UE.

The number of the cell groups configured for the UE may be configured as the number of groups obtained by grouping cells with a difference of UL transmission timing with one cell configured for the UE, greater than a preset value, based on UL-DL configuration.

Advantageous Effects

According to embodiments of the present invention, data can be smoothly transmitted and received between a base station and a user equipment in a wireless access system, preferably, in a time division duplex (TDD) wireless access system that supports a carrier aggregation.

In addition, according to embodiments of the present invention, cross carrier scheduling between component carriers having different uplink-downlink configurations can be smoothly performed in a TDD wireless access system for supporting carrier aggregation.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
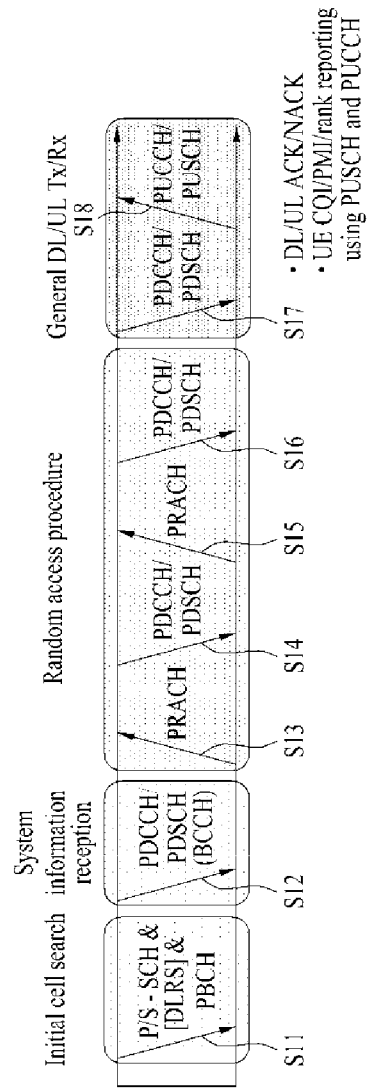
FIG. 1 is a diagram for explanation of physical channels and a general method for transmitting signals on the physical channels in a 3rd generation partnership project (3GPP) long term evolution (LTE) system.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices are shown in block diagram form. The same reference numbers will be used throughout the drawings to refer to the same or like parts.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "relay" may be replaced with the terms relay node (RN) or relay station (RS). The term "terminal" may also be replaced with a user equipment (UE), a mobile station (MS), a mobile subscriber station (MSS) or a subscriber station (SS) as necessary.

It should be noted that specific terms disclosed in the present invention are proposed for convenience of description and better understanding of the present invention, and the use of these specific terms may be changed to other formats within the technical scope or spirit of the present invention.

Exemplary embodiments of the present invention are supported by standard documents disclosed for at least one of wireless access systems including an institute of electrical and electronics engineers (IEEE) 802 system, a $3^{rd}$ generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (utra) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

For clarity, the following description focuses on 3GPP LTE/LTE-A. However, technical features of the present invention are not limited thereto.

1. Overview of 3GPP LTE/LTE-A System to which the Present Invention is Applied 1.1. Overview of System FIG. 1 is a diagram for explanation of physical channels and a general method for transmitting signals on the physical channels in a 3GPP LTE system.

When a UE is powered on or enters a new cell, the UE performs initial cell search (S11). The initial cell search involves acquisition of synchronization to a base station (BS). To this end, the UE synchronizes its timing to the BS and acquires a cell identifier (ID) and other information by receiving a primary synchronization channel (P-SCH) and a secondary synchronization channel (S-SCH) from the BS.

Then the UE may acquire information broadcast in the cell by receiving a physical broadcast channel (PBCH) from the BS. During the initial cell search, the UE may monitor a downlink channel state by receiving a downlink reference signal (DL RS).

After the initial cell search, the UE may acquire detailed system information by receiving a physical downlink control channel (PDCCH) and a physical downlink shared channel (PDSCH) based on information included in the PDCCH in S12.

In order to complete access to the BS, the UE may perform a random access procedure with the BS (S13 to S16). In the random access procedure, the UE may transmit a preamble on a physical random access channel (PRACH) (S13), and may receive a response message to the preamble on a PDCCH and a PDSCH corresponding to the PDCCH (S14). In case of a contention-based RACH, the UE may additionally perform a contention resolution procedure such as transmission (S15) of an additional PRACH signal and reception (S16) of a PDCCH signal and a PDSCH corresponding to the PDCCH signal.

After the above procedure, the UE may receive a PDCCH and/or a PDSCH from the BS (S17) and transmit a physical uplink shared channel (PUSCH) and/or a physical uplink control channel (PUCCH) to the BS (S18), which is a general downlink and uplink signal transmission procedure.

Control information that the UE transmits to the BS is called uplink control information (UCI). The UCI includes hybrid automatic repeat and request acknowledgement/negative-ack (HARQ-ACK/NACK), scheduling request (SR), channel quality indication (CQI), precoding matrix indication (PMI), Rank Indication (RI) information, etc.

In an LTE system, in general, the UCI is periodically transmitted through a PUCCH. However, in order to simultaneously transmit control information and traffic data, the UCI may be transmitted through a PUSCH. In addition, the UCI may be aperiodically transmitted through a PUSCH according to a request/command of a network.

Figure 2:
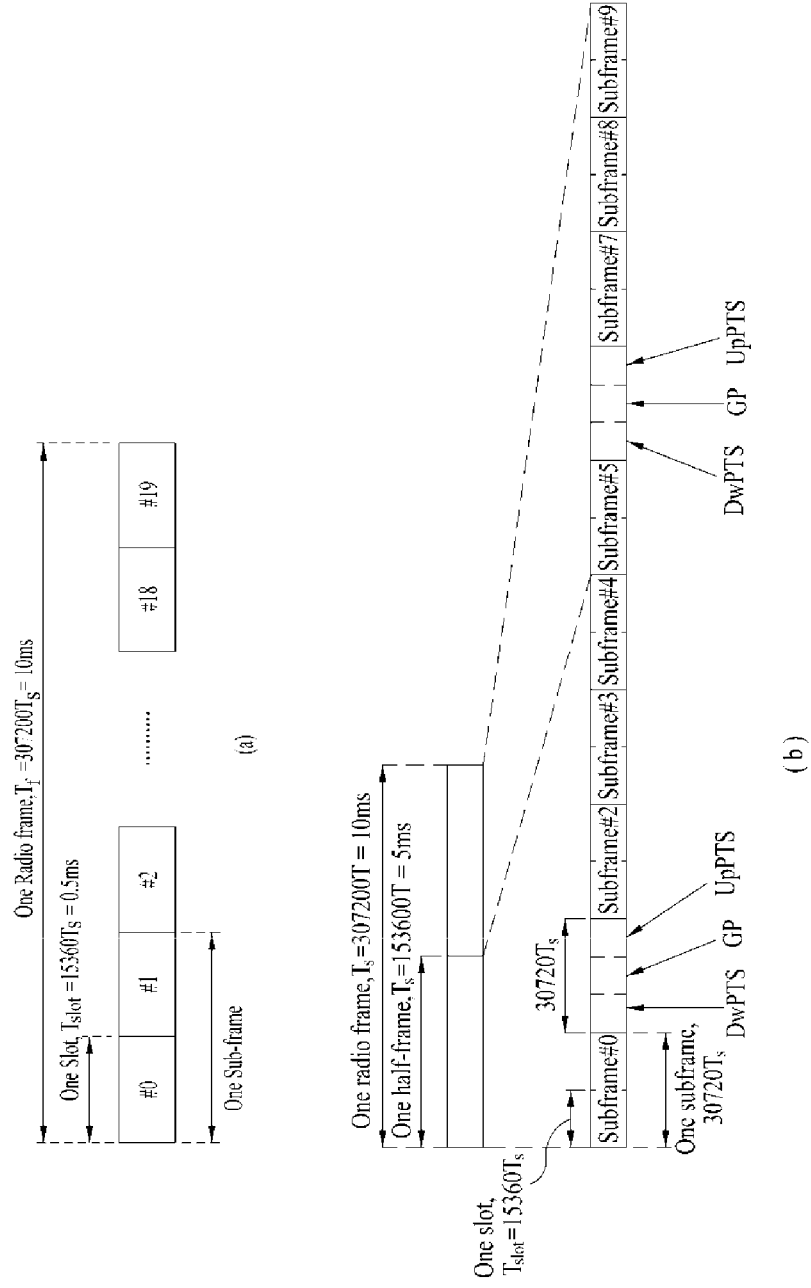
FIG. 2 is a diagram illustrating a structure of a radio frame used in a 3GPP LTE.

FIG. 2 is a diagram illustrating a structure of a radio frame used in a 3GPP LTE.

FIG. 2(a) illustrates a frame structure type 1. The frame structure type 1 may be applied to both a full duplex frequency division duplex (FDD) system and a half duplex FDD system.

One radio frame has a length of $T_f = 307200 \cdot T_s = 10$ ms and a uniform length of $T_{slot} = 15360 \cdot T_s = 0.5$ ms. Each radio frame is divided into 20 slots with indexes of 0 to 19. One subframe is defined as two contiguous slots and an ith subframe includes slots corresponding to 2i and 2i+1. That is, a radio frame includes ten subframes. Time for transmission of one subframe is referred to as a transmission time interval (TTI). Here, Ts denotes sampling time and is represented by $Ts = 1/(15 \text{ kHz} \times 2048) = 3.2552 \times 10^{-8}$ (about 33 ns). A slot includes a plurality of OFDM symbols or SC-FDMA symbols in a time domain and includes a plurality of resources block in a frequency domain.

One slot includes a plurality of orthogonal frequency division multiplexing (OFDM) symbols in a time domain. A 3GPP LTE uses the OFDMA in downlink and thus the OFDM symbol is used to represent one symbol period. The OFDM symbol may be referred to as one SC-FDMA symbol or symbol period. A resource block is a resource allocation unit and includes a plurality of contiguous subcarriers in one slot.

In the full duplex FDD system, ten subframes may be simultaneously used for downlink transmission and uplink transmission during each period of 10 ms. In this case, uplink and downlink transmission are separated in a frequency domain. On the other hand, in the half duplex FDD system, a UE cannot simultaneously perform transmission and reception.

The aforementioned structure of the radio frame is purely exemplary and thus the number of subframes included in the radio frame, the number of slots included in a subframe, or the number of OFDM symbols included in a slot may be changed in various ways.

FIG. 2(b) illustrates a frame structure type 2. The frame structure type 2 may be applied to a TDD system. One radio frame has a length of $T_f = 307200 \cdot T_s = 10$ ms and two half frames having a length of $153600 \cdot T_s = 5$ ms. Each half frame includes five subframes having a length of $30720 \cdot T_s = 1$ ms. An ith subframe includes two slots with a length of $T_{slot} = 15360 \cdot T_s = 0.5$ ms corresponding to 2i to 2i+1. Here, Ts denotes sampling time and is represented by $Ts = 1/(15 \text{ kHz} \times 2048) = 3.2552 \times 10^{-8}$ (about 33 ns).

The frame structure type 2 includes a special subframe including three fields of a downlink pilot time slot (DwPTS), guard period (GP), and uplink pilot time slot (UpPTS). Here, the DwPTS is used for initial cell search, synchronization or channel estimation at user equipment (UE). The UpPTS is used to synchronize channel estimation at the base station with uplink transmission of the UE. The GP is to remove interference occurring in uplink due to multipath delay of downlink signals between uplink and downlink.

Table 1 below shows a special frame configuration (length of DwPTS/GP/UpPTS).

TABLE 1

|  | Normal cyclic prefix in downlink | | | Extended cyclic prefix in downlink | | |
|---|---|---|---|---|---|---|
|  |  | UpPTS | | | UpPTS | |
|  |  | Normal | Extended |  | Normal cyclic | Extended cyclic |
| Special subframe configuration | DwPTS | cyclic prefix in uplink | cyclic prefix in uplink | DwPTS | prefix in uplink | prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
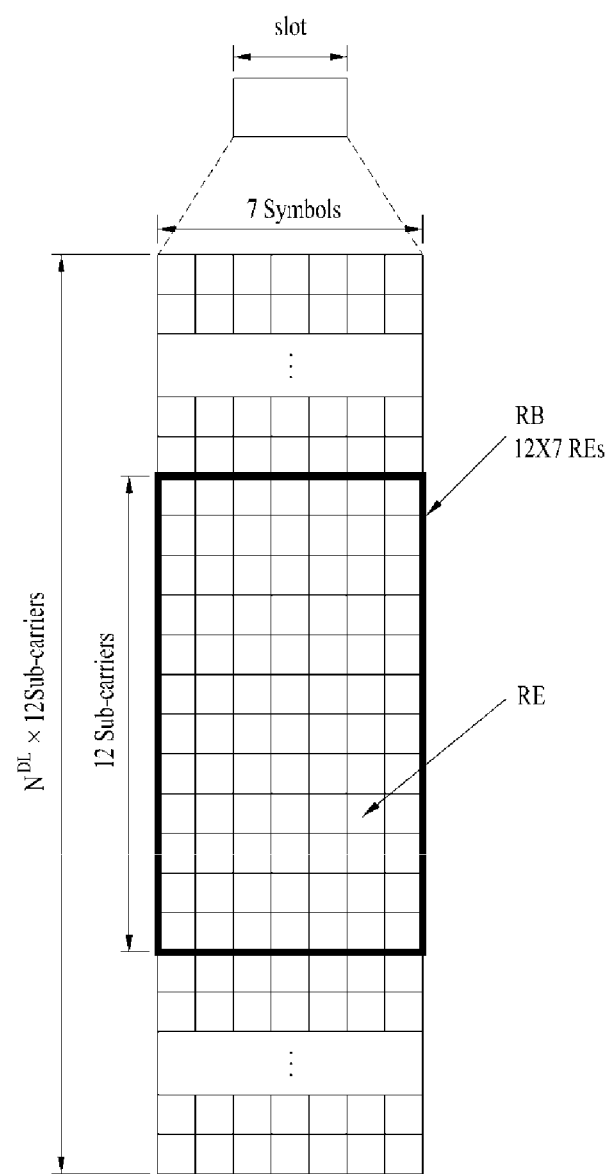
FIG. 3 is a diagram illustrating an example of a resource grid of a downlink slot.

FIG. 3 is a diagram illustrating an example of a resource grid of a downlink slot.

Referring to FIG. 3, one downlink slot includes a plurality of OFDM symbols in a time domain. Here, a downlink slot includes 7 OFDM symbols in a time domain and a resource block (RB) includes 12 subcarriers in a frequency domain, which does not limit the scope and spirit of the present invention.

Each element of the resource grid is referred to as a resource element (RE). An RB includes 12×7 REs. The number of RBs in a downlink slot, $N^{DL}$ depends on a downlink transmission bandwidth. An uplink slot may have the same structure as a downlink slot.

Figure 4:
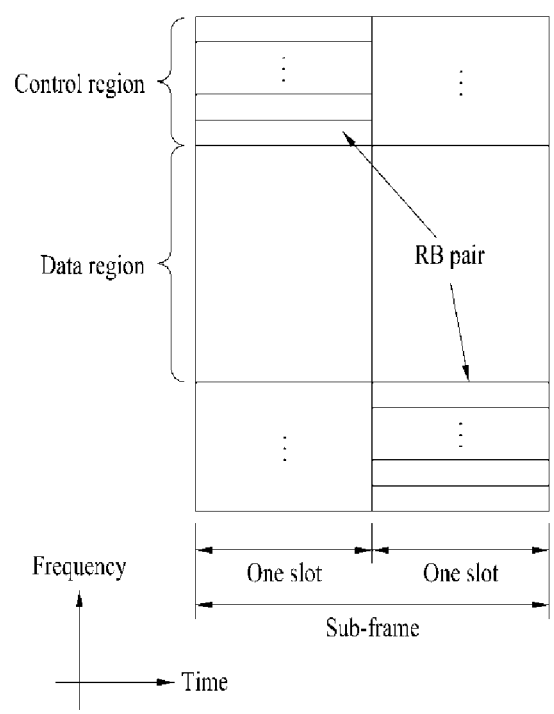
FIG. 4 is a diagram illustrating a structure of an uplink subframe.

FIG. 4 is a diagram illustrating a structure of an uplink subframe.

Referring to FIG. 4, the uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Figure 5:
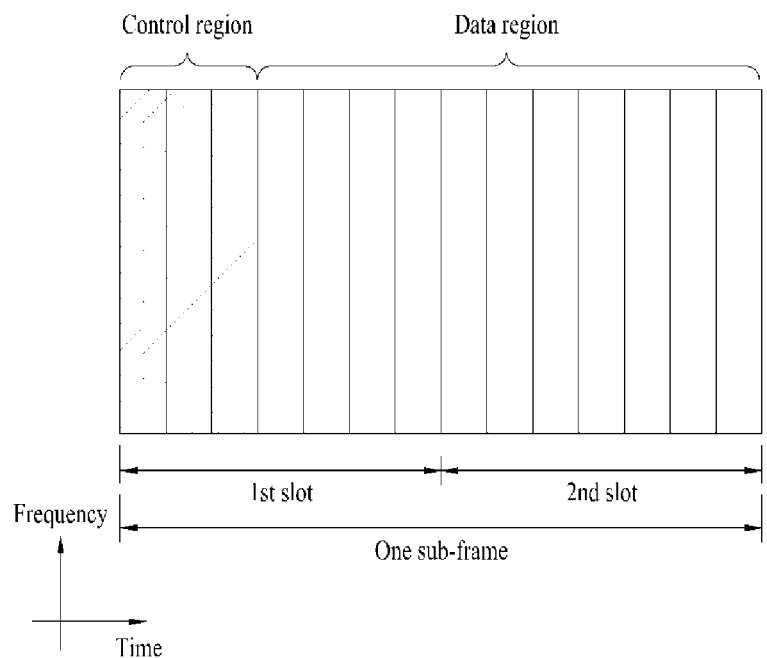
FIG. 5 is a diagram illustrating a structure of a downlink subframe.

FIG. 5 is a diagram illustrating a structure of a downlink subframe.

Referring to FIG. 5, a maximum of 3 OFDM symbols at the start of the first slot in the subframe are used for a control region to which control channels are allocated and the other OFDM symbols of the downlink subframe are used for a data region to which a PDSCH is allocated. Downlink control channels used in the 3GPP LTE system include, for example, a physical control format indicator channel (PCFICH), a physical downlink control channel (PDCCH), and a physical hybrid automatic repeat request (HARQ) indicator channel (PHICH).

The PCFICH is transmitted in the first OFDM symbol of a subframe, carrying information (that is, area of control region) about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink allocation information, or uplink transmission (Tx) power control commands for UE groups.

1.2. Physical Downlink Control Channel (PDCCH)

1.2.1. Overview of PDCCH

PDCCH may carry resource allocation and transmission format of downlink shared channel (DL-SCH) (which is referred to as downlink grant.), resource allocation information of uplink shared channel (UL-SCH) (which is referred to as uplink grant), paging information on paging channel (PCH), system information on DL-SCH, resource allocation of upper-layer control message such as a random access response transmitted on a PDSCH, a Tx power control command set of individual UEs in a UE group, activation indication information of voice over IP (VoIP), etc. A plurality of PDCCHs may be transmitted in a control region. A UE may monitor a plurality of PDCCHs. A PDCCH includes one control channel element (CCE) or an aggregate of one or several contiguous CCEs. The PDCCH including one CCE or the aggregate of the contiguous CCEs may be subblock-interleaved and transmitted through the control region. The CCE is a logical allocation unit used to provide a coding rate to a PDCCH based on a radio channel state. The CCE corresponds to a plurality of resource element groups (REGs). PDCCH format and a bit number of available PDCCH are determined according to a relationship between the number of the CCEs and the coding rate provided from the CCEs 1.2.2. Structure of PDCCH A plurality of multiple PDCCHs for a plurality of UEs may be transmitted in a control region. The PDCCH includes aggregation of one or two contiguous CCES. A CCE refers to a unit corresponding to 9 sets of REGs including four resource elements. Four quadrature phase shift keying (QPSK) symbols are mapped to each REG. Resource elements occupied by reference signals (RSs) are not included in the REG. That is, a total number of REGs in an OFDM symbol may be changed according to whether a cell-specific reference signal is present. A concept of the REG for mapping four resource elements to one group can also be applied to different downlink control channels (e.g., PCFICH or PHICH). When REG that is not allocated to PCFICH or PHICH is $N_{REG}$, the number of available CCEs in the system is $N_{CCE}=\lfloor N_{REG}/9 \rfloor$ and each CCE has an index from 0 to $N_{CCE}-1$.

In order to simplify a decoding procedure of a UE, a PDCCH format including n CCEs may be started from CCEs having the same index as multiple of n. That is, when a CCE index is i, the PDCCH format may be started from a CCE that satisfies i mod n=0.

A BS may use 1, 2, 4, or 8 CCEs in order to configure one PDCCH signal. In this case, {1, 2, 4, 8} is referred to as a CCE aggregation level. The number of CCEs used for transmission of a specific PDCCH is determined by the BS according to a channel state. For example, only one CCE may be sufficient for a PDCCH for a UE having a satisfactory downlink channel state (when the UE is close to the BS). On the other hand, a UE having a poor channel state (when the UE is located at a cell edge) requires 8 CCEs for sufficient robustness. In addition, a power level of the PDCCH may match a channel state and adjusted.

Table 2 below shows a PDCCH format. Four PDCCH formats are supported according to a CCE aggregation level as shown in Table 1 above.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCE aggregation levels are different for respective UEs because modulation and coding scheme (MCS) levels or formats of control information contained in a PDCCH are different. An MCS level refers to a code rate and modulation order used in data coding. An adaptive MCS level is used for link adaptation. In general, a control channel for transmission of control information may consider 3 to 4 MCS levels.

A format of control information is now described. Control information transmitted on the PDCCH is referred to as downlink control information (DCI). According to a DCI format, configuration of information contained in PDCCH payload may be changed. The PDCCH payload refers to an information bit. Table 3 below shows a DCI according to a DCI format.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

As shown in Table 2 above, a DCI format includes Format 0 for PUSCH scheduling, Format 1 for scheduling of one PDSCH codeword, Format 1A for compact scheduling of one PDSCH codeword, Format 1C for very compact scheduling of DL-SCH, Format 2 for PDSCH scheduling in a closed-loop spatial multiplexing mode, Format 2A for PDSCH scheduling in an open-loop spatial multiplexing mode, and Formats 3 and 3A for transmission of a transmission power control (TPC) command for an uplink channel. The DCI Format 1A may be used for PDSCH scheduling regardless of a transmission mode configured for a UE.

A length of the PDCCH payload may be changed according to a DCI format. In addition, a type of the PDCCH payload and a length of the PDCCH payload according thereto may be changed according to whether compact scheduling is used or not or a transmission mode configured for the UE.

The transmission mode may be configured in such a way that the UE receives downlink data on a PDSCH. For example, the downlink data on the PDSCH may include data scheduled for the UE, paging, random access response, or broadcast information on a BCCH. The downlink data on the PDSCH is associated with a DCI format signaled on the PDCCH. The transmission mode may be semi-statically configured in the UE via upper layer signaling (e.g., RRC signaling). The transmission mode may be classified into a single antenna transmission mode or a multi-antenna transmission mode. The UE may semi-statically establish the transmission mode via upper layer signaling. For example, multiple-antenna transmission is performed using transmit diversity, open-loop or closed-loop spatial multiplexing, multi-user-multiple input multiple output (MU-MIMO), beamforming, or the like. The transmit diversity is technology for transmitting the same data in a multiple Tx antennas to increase transmission reliability. The spatial multiplexing is technology for simultaneously transmitting different data in a multiple Tx antenna to transmit data at high speed without increase in bandwidth of a system. The beamforming is technology for applying a weight according to a channel state in a multiple antenna to increase signal to interference plus noise ratio (SINR) of a signal.

The DCI format depends on a transmission mode configured for the UE. The UE may use a reference DCI format monitored thereby according to a transmission mode configured for the UE. The transmission mode configured for the UE may include the following seven transmission modes.

(1) single antenna port; port 0
(2) transmit diversity
(3) open-loop spatial multiplexing
(4) closed-loop spatial multiplexing
(5) multiple user MIMO
(6) closed loop=1 precoding
(7) single antenna port; port 5

1.2.3. PDCCH Transmission

A BS determines a PDCCH format according to DCI to be transmitted to a UE and adds cyclic redundancy check (CRC) to control information. The CRC is masked by a dedicated identifier (ID) (which is known as a radio network temporary identifier (RNTI)) according to the owner or usage of the PDCCH. If the PDCCH is destined for a specific UE, the CRC may be masked by a dedicated ID, for example, a cell-RNTI (C-RNTI) of the UE. If the PDCCH carries a paging message, the CRC of the PDCCH may be masked by a paging indicator identifier (P-RNTI). If the PDCCH carries system information, particularly, a system information block (SIB), its CRC may be masked by a system information ID and a system information RNTI (SI-RNTI). To indicate that the PDCCH carries a random access response to a random access preamble transmitted by a UE, its CRC may be masked by a random access-RNTI (RA-RNTI).

Then the BS channel-codes the control information to which the CRC is added to generate coded data. In this case, the channel coding may be performed with a code rate according to an MCS level. The BS performs transmission rate matching according to a CCE aggregation level allocated to a PDCCH format and modulates the coded data to generate modulation symbols. In this case, a modulation sequence according to an MCS level may be used. A CCE aggregation level of modulation symbols included in one PDCCH may be any one of 1, 2, 4, and 8. Then the BS performs CCE to RE mapping on the modulation symbols.

1.2.4. Blind Decoding

A plurality of PDCCHs may be transmitted in one subframe. That is, a control region of one subframe includes a plurality of CCEs with an index 0 to $N_{CCE,k}-1$. Here, $N_{CCE,k}$ refers to a total number of CCEs in a control region of a kth subframe. A UE monitors a plurality of PDCCHs every subframe. Here, monitoring refers to trial of decoding of PDCCHs according to a PDCCH format monitored by the UE. The BS does not provide information regarding a position of corresponding PDCCH to the UE via a control region allocated in a subframe. In order to receive a control channel transmitted from the BS, the UE cannot know a position where PDCCH of the UE is transmitted and a CCE aggregation level or a DCI format at which the PDCCH is transmitted, and thus the UE monitors a set of PDCCH candidates in a subframe to search for a PDCCH for the UE, which is called blind decoding/detection (BD). The BD refers to a method in which a UE de-masks a UE ID of the UE to a CRC portion and then checks CRC errors to check whether corresponding PDCCH is a control channel of the UE.

In an active mode, the UE monitors a PDCCH every subframe in order to receive data transmitted to the UE. In a DRX mode, the UE wakes up in a monitoring duration every DRX period and monitors PDCCH in a subframe corresponding the monitoring duration. A subframe in which monitoring of PDCCH is performed is referred to as a non-DRX subframe.

The UE needs to perform binding decoding on all CCEs present in a control region of the non-DRX subframe in order to receive PDCCH transmitted to the UE. The UE cannot know a format of the transmitted PDCCH. Thus, all PDCCHs need to be decoded at an available CCE aggregation level until blind decoding of the PDCCH is successfully performed every non-DRX subframe. The UE cannot know the number of CCEs used by PDCCH for the UE and thus the UE needs to try detection at all available CCE aggregation levels until blind decoding of PDCCH is successfully performed.

An LTE system defines the concept of a search space (SS) for blind decoding of the UE. The SS may refer to a PDCCH candidate set to be monitored and have different sizes according to a PDCCH format. The SS may include a common search space (CSS) and UE-specific/dedicated search space (USS). With regard to the CSS, all UEs can know the size of the CSS. However, the USS can be separately configured for each respective UE. Thus, the UE needs to monitor both the CSS and the USS in order to decode PDCCH and thus needs to perform BD a maximum of 44 times in one subframe. Here, BD performed according to different CRC values (e.g., C-RNTI, P-RNTI, SI-RNTI, and RA-RNTI) is not used.

Due a small SS, the BS cannot frequently ensure CCE resources for transmitting a PDCCH to all UEs that desire to transmit a PDCCH in a predetermined subframe. This is because remaining resources after a CCE position is allocated may not be included in the SS of a specific UE. In order to minimize this problem that may continuously arises in a next subframe, a UE-specific hopping sequence may be applied to a start point of the USS.

Table 4 below shows sizes of the CSS and the USS.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to reduce calculation load of the UE according to the number of trails of blind decoding, the UE does not simultaneously perform searches according to all defined DCI formats. In detail, the UE always performs searches on the DCI format 0 and 1A in the USS. In this case, the DCI formats 0 and 1A have the same size. However, the UE can differentiate DCI formats using flag for format 0/format 1A differentiation used to differentiate the DCI formats 0 and 1A included in PDCCH. In addition, the UE may require other DCI formats other than the formats 0 and 1A, for example, the DCI formats 1, 1B, and 2.

In the CSS, the UE may search for the DCI formats 1A and 1C. In addition, the UE may be configured to search for the DCI format 3 or 3A and the DCI formats 3 and 3A have the same size as the DCI formats 0 and 1A. However, the UE may identify a DCI format using a scrambled CRC using other identifiers other than a UE-specific ID.

A search space $S_k^{(L)}$ refers to a PDCCH candidate set according to an aggregation level $L \in \{1,2,4,8\}$. A CCE according to a PDCCH candidate set m of an SS may be determined according to Expression 1 below.

$$L \cdot \{(Y_k+m) \bmod \lfloor N_{CCE,k}/L \rfloor\}+i \quad \text{[Expression 1]}$$

Here, $M^{(L)}$ is the number of PDCCH candidates according to a CCE aggregation level L for monitoring in an SS and satisfies $m=0, \ldots, M^{(L)}-1$. i is an index for determination of a separate CCE in each respective PDCCH candidate in the PDCCH and satisfies $i=0, \ldots, L-1$. $k=\lfloor n_s/2 \rfloor$ is satisfied and $n_s$ is a slot index in a radio frame.

As described above, the UE monitors both a USS and a CSS in order to decode the PDCCH. Here, the CSS supports PDCCHs having an aggregation level of $\{4, 8\}$ and the USS supports PDCCHs having an aggregation level of $\{1, 2, 4, 8\}$. Table 5 below shows PDCCH candidates monitored by the UE.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

Referring to Expression 1 above, in case of the CSS, $Y_k$ is configured to 0 with regard to two aggregation levels, L=4 and L=8. On the other hand, in case of the USS, $Y_k$ is defined according to Expression 2 below with regard to an aggregation level L.

$$Y_k = (A \cdot Y_{k-1}) \bmod D \quad \text{[Expression 2]}$$

Here, $Y_{-1}=n_{RNTI} \neq 0$ is satisfied and $n_{RNTI}$ is RNTI. In addition, A=39827 and D=65537 are satisfied.

2. Carrier Aggregation Environment

2.1. Overview of Carrier Aggregation

Communication environments considered in embodiments of the present invention include all multi-carrier environments. That is, a multi-carrier system or a multi-carrier aggregation system refers to a system that aggregates one or more component carriers (CCs) each having a smaller bandwidth than a target bandwidth in order to support a wideband in the present invention.

In the present invention, multi-carrier means carrier aggregation (or carrier combining). Carrier aggregation covers aggregation of non-contiguous carriers as well as aggregation of contiguous carriers. In addition, the number of CCs that are aggregated in downlink and uplink may be configured in different ways. A case in which the number of downlink CCs and the number of uplink CCs are the same is referred to as symmetric aggregation, and a case in which the number of downlink CCs and the number of uplink CCs are different is referred to as asymmetric aggregation. The term carrier aggregation is interchangeably used with bandwidth aggregation, spectrum aggregation, etc.

The LTE-A system aims to support a bandwidth of up to 100 MHz by use of multi-carriers (i.e. carrier aggregation) configured by aggregating two or more CCs. To guarantee backward compatibility with a legacy IMT system, each of one or more carriers, which has a smaller bandwidth than a target bandwidth, may be limited to a bandwidth used in the legacy system. For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of radio frequency (RF) ends to conduct communication in a CA environment.

The LTE-A system adopts the concept of a cell to manage radio resources. The aforementioned carrier aggregation environment may refer to a multiple cell environment. A cell is defined by combining DL and UL resources, although the UL resources are not a necessity. Accordingly, a cell may be configured with DL resources alone or DL and UL resources. When a specific UE has only one configured serving cell, the cell may have one DL CC and one UL CC. When a specific UE has two or more configured serving cells, the cells may has DL CCs, the number of which is equal to the cells, and UL CCs, the number of which is equal to or less than the DL CCs. On the other hand, DL CCs and UL CCs may be configured in an opposite way. That is, when a specific UE has a plurality of configured serving cells, a carrier aggregation environment in which the number of DL CCs is more than the number of UL CCs may be supported. That is, carrier aggregation is interpreted as aggregation of two or more cells having different carrier frequencies (center frequencies of the cells). Here, the term 'cell' used herein needs to be distinguished from a 'cell' as a region covered by a BS. Hereinafter, the aforementioned intra-band carrier aggregation will be referred to as an intra-band multiple cell and the inter-band carrier aggregation will be referred to as an inter-band multiple cell.

A cell used in the LTE-A system includes a primary cell (PCell) and a secondary cell (SCell). The PCell and the SCell may be used as serving cells. If the UE is in RRC_CONNECTED state but carrier aggregation has not been configured or is not supported in the UE, only one serving cell including a PCell exists for the UE. On the other hand, if the UE is in RRC_CONNECTED state and carrier aggregation has been configured for the UE, one or more serving cells may exist for the UE. The total serving cells include a PCell and one or more SCells.

The serving cells (the Pcell and the S cell) may be configured via an RRC parameter. PhysCellId is a physical layer ID of a cell and has an integer of 0 to 503. SCellIndex is a short ID used for identifying the S cell and has an integer of 1 to 7. ServCellIndex is a short ID for identifying the serving cell (the P cell or the S cell) and has an integer of 0 to 7. 0 is applied to the P cell and SCellIndex is pre-given so as to be applied to the S cell. That is, a cell having a smallest cell ID (or a cell index) of ServCellIndex is the P cell.

The P cell refers to a cell that operates at a primary frequency (or a primary CC). The P cell may be used to perform an initial connection establishment procedure or a connection reconfiguration procedure via a UE and refer to a cell indicated during a handover procedure. In addition, the P cell is a cell serving as a center of control-related communication among cells configured in a CA environment. That is, a UE may be allocated with a PUCCH only in a P cell of the UE and transmit the PUCCH. In addition, the UE may use only the P cell to acquire system information or change a monitoring procedure. Evolved universal terrestrial radio access (E-UTRAN) may change only the P cell for a handover procedure using an RRCConnectionReconfigutaion message of an upper layer, containing mobilityControlInfo in a UE that supports a CA environment.

The S cell may refer to a cell that operates at a secondary frequency (or a secondary CC). Only one P cell may be allocated to a specific UE and one or more S cells may be allocated to the UE. The S cell can be configured after RRC connection is established and used to supply additional radio resources. Among serving cells configured in the CA environment, a PUCCH is not present in cells except for P cells, that is, S cells. When S cells are added to the UE that supports the CA environment, the E-UTRAN may supply all system information related to an operation of a related cell in RRC_CONNECTED state through a dedicated signal. Change in the system information may be controlled according to release and addition of related S cells. In this case, an RRCConnectionReconfigutaion message of an upper layer may be used. The E-UTRAN may perform dedicated signaling with different parameters for respective UEs instead of broadcasting in related S cells.

After an initial security activation procedure is initiated, the E-UTRAN may add one or more S cells to a P cell that is initially configured during a connection establishment procedure to configure a network including one or more S cells. In a CA environment, the P cell and the S cell may act as component carriers. In the following embodiments of the present invention, a primary component carrier (PCC) may have the same meaning as the P cell and a secondary component carrier (SCC) may have the same meaning as the S cell.

Figure 6:
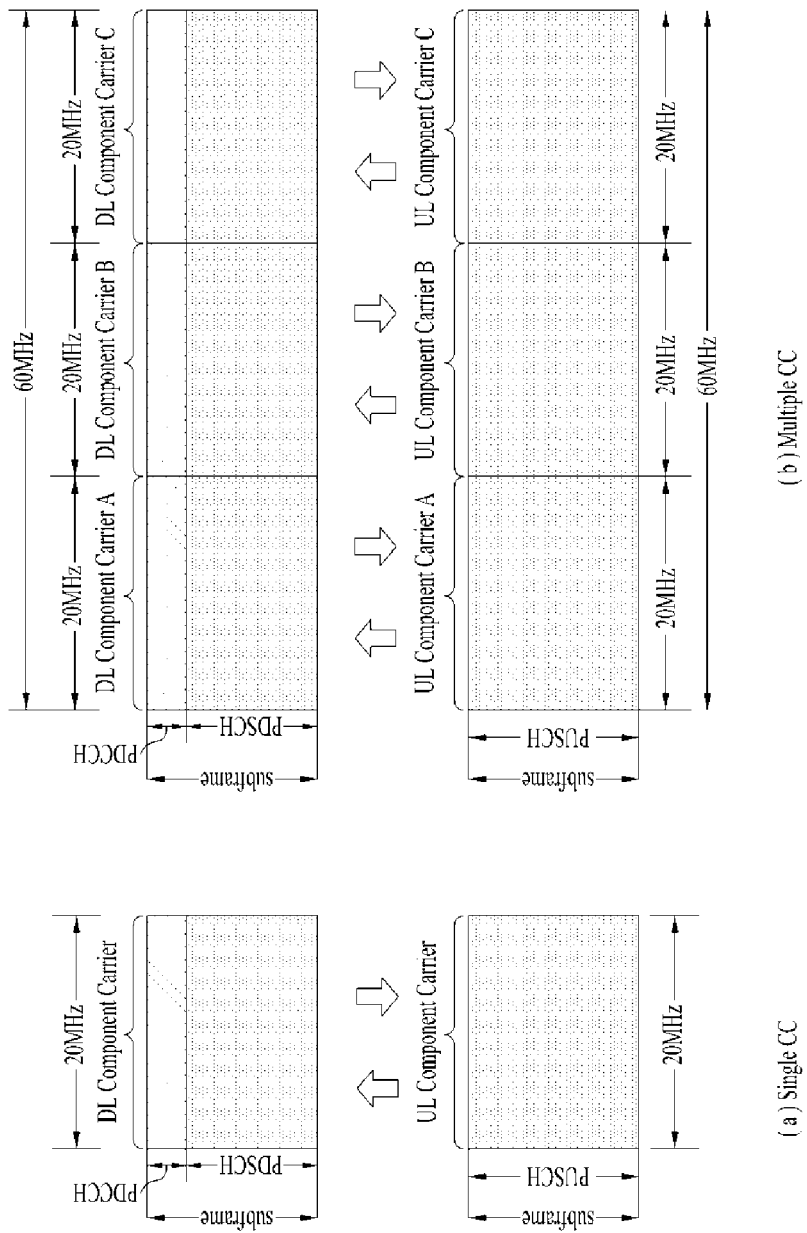
FIG. 6 is a diagram illustrating an example of a component carrier (CC) of an LET system and carrier aggregation (CA) used in an LTE_A system.

FIG. 6 is a diagram illustrating an example of a component carrier (CC) of an LET system and CA used in an LTE_A system.

FIG. 6(a) illustrates a single carrier structure used in the LTE system. The CC includes a DL CC and a UL CC. One CC may have a frequency range of 20 MHz.

FIG. 6(b) illustrates a CA structure used in the LTE_A system. FIG. 6(b) illustrates a case in which three CCs with a frequency of 20 MHz are combined. Although three DL CCs and three UL CCs are illustrated, the number of the DL CCs and UL CCs are not limited. In case of CA, a UE may simultaneously monitor three CCs, receive downlink signals/data, and transmit uplink signals/data.

When N DL CCs are managed in a specific cell, a network may allocate M (M≤N) DL CCs to a UE. In this case, the UE may monitor only the M limited DL CCs and receive a DL signal. In addition, the network may apply priority L (L≤M≤N) DL CCs to allocate a primary DL CC to the UE. In this case, the UE should monitor L DL CCs. This manner may be applied to uplink transmission in the same way.

The linkage between the carrier frequency of DL resources (or a DL CC) and the carrier frequency of UL resources (or a UL CC) may be indicated by system information or an upper layer message such as an RRC message. For example, a combination of DL resources and UL resources may be configured by the linkage defined by a system information block type 2 (SIB2). In detail, the linkage may refer to a mapping relationship between DL CC for transmission of PDCCH for carrying UL grant and UL CC using the UL grant or a mapping relationship between DL CC (or UL CC) for transmission of data for HARQ and UL CC (or DL CC) for transmission of an HARQ ACK/NACK signal.

2.2. Cross Carrier Scheduling

In a CA system, from a point of view of scheduling on a serving cell or carrier, there are two methods, i.e., self-scheduling and cross carrier scheduling. The cross carrier scheduling may refer to cross component carrier scheduling or cross cell scheduling.

The self-scheduling refers to transmission of PDCCH (DL grant) and PDSCH via the same DL CC or transmission of PUSCH, transmitted on PDCCH (UL grant) transmitted via DL CC, via UL CC linked with DL CC for reception of UL grant.

The cross carrier scheduling refers to transmission of a PDCCH (DL grant) and PDSCH via different DL CCs or transmission of a PUSCH, transmitted on a PDCCH (UL grant) transmitted via a DL CC, via a UL CC that is not an UL CC linked with DL CC for reception of UL grant.

Whether to perform the cross carrier scheduling may be activated or deactivated UE-specifically or semi-statically known for each respective UE via upper layer signaling (e.g., RRC signaling).

When the cross carrier scheduling is activated, a PDCCH requires a carrier indicator field (CIF) indicating DL/UL CC for transmission of PDSCH/PUSCH indicated by the corresponding PDCCH. For example, the PDCCH may allocate PDSCH resources or PUSCH resources to one of a plurality of CCs using the CIF. That is, when the PDSCH or PUSCH resources are allocated to one of DL/UL CC via which PDCCH on DL CC is multiple-aggregated, the CIF is configured. In this case, a DCI format of LTE Release-8 may be extended according to the CIF. In this cast, the configured CIF may be fixed to a 3 bit field or fixed regardless of a DCI format size. In addition, an LTE Release-8 PDCCH structure (the same coding and same CCE-based resource mapping) may be reused.

On the other hand, when a PDCCH on a DL CC allocates PDSCH resources on the same DL CC or allocates PUSCH resources on single-linked UL CC, the CIF is not configured. In this case, the same PDCCH structure (the same coding and same CCE-based resource mapping) and the same DCI format as LTE Release-8 may be used.

When the cross carrier scheduling is possible, the UE needs to monitor a PDCCH of a plurality of DCIs in a control region of monitoring CC according to a transmission mode and/or bandwidth for each respective CC. Thus, PDCCH monitoring and configuration of a search space for supporting this are required.

In a CA system, a UE DL CC set is a set of DL CCs scheduled such that the UE receives a PDSCH and a UE UL CC set is a set of UL CCs scheduled such that the UE transmits a PUSCH. In addition, a PDCCH monitoring set is a set of at least one DL CC that performs the PDCCH monitoring. A PDCCH monitoring set may be the same as a UE DL CC or a subset of the UE DL CC set. The PDCCH monitoring set may include at least one of DL CCs in the UE DL CC set. Alternatively, the PDCCH monitoring set may be defined regardless of the UE DL CC set. A DL CC included in the PDCCH monitoring set may be configured such that self-scheduling with respect to UL CC linked with the DL CC is always possible. The UE DL CC set, the UE UL CC set, and the PDCCH monitoring set may be set UE-specifically, UE group-specifically, or cell-specifically.

When the cross carrier scheduling is deactivated, the PDCCH monitoring set is always the same as the UE DL CC set. In this case, indication such as separate signaling with respect to the PDCCH monitoring set is not required. However, when the cross carrier scheduling is activated, it is preferable that the PDCCH monitoring set is defined in the UE DL CC set. That is, in order to schedule a PDSCH or PUSCH for a UE, a BS transmits a PDCCH via the PDCCH monitoring set only.

Figure 7:
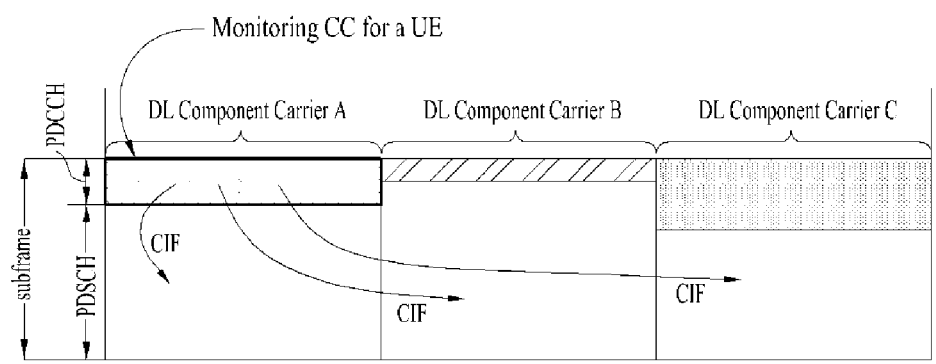
FIG. 7 illustrates a subframe structure of an LTE-A system according to cross carrier scheduling.

FIG. 7 illustrates a subframe structure of an LTE-A system according to cross carrier scheduling.

Referring to FIG. 7, a DL subframe for an LTE-A UE is formed by combining three DL CCs and a DL CC 'A' is configured as a PDCCH monitoring DL CC. When a CIF is not used, each DL CC may transmit a PDCCH for scheduling a PDSCH thereof without a CIF. On the other hand, when the CIF is used via upper layer signaling, only one DL CC 'A' may transmit a PDSCH thereof or a PDCCH for scheduling a PDSCH of another CC using a CIF. In this case, DL CCs 'B' and 'C' that are not configured as a PDCCH monitoring DL CC do not transmit PDCCH.

3. Overview of Uplink/Downlink Scheduling in TDD System 3.1. UL-DL Configuration in TDD System UL-DL configurations for frame structure type 2 represent rules of allocating (or reserving) each subframe as a DL subframe or a UL subframe. Table 6 below lists such UL-DL configurations.

TABLE 6

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 6 above, "D" represents a DL subframe, "U" represents a UL subframe, and "S" represents a special subframe including a DwPTS, a GP, and an UpPTS in a radio frame. 7 UL-DL configurations are available and differ in the positions or numbers of DL subframes, special subframes, and UL subframes.

A time point at which DL switches to UL or UL switches to DL is called a switch point. Switch-point periodicity is a period in which switching between a UL subframe and a DL subframe is repeated in the same manner. The switch-point periodicity is 5 ms or 10 ms. If the switch-point periodicity is 5 ms, a special subframe S exists in every half-frame and if the switch-point periodicity is 5 ms, a special subframe S is confined to the first half-frame.

In every UL-DL configuration, subframe 0, subframe 5, and the DwPTS are used for DL transmission, and the UpPTS and the subframe following a special subframe are always used for UL transmission.

The UL-DL configurations are system information that may be known to both an eNB and UEs. Each time UL-DL configuration information is changed, the eNB may indicate the change in the UL-DL allocation state of a radio frame to a UE by transmitting only the index of configuration information. The configuration information is a kind of DCI and may be transmitted on a DL control channel, PDCCH like other scheduling information. The configuration information may be broadcast to all UEs within a cell on a BCH. The number of half-frames in a radio frame, the number of subframes in a half-frame, and DL-UL subframe combinations in the TDD system are purely exemplary.

3.2. UL/DL Scheduling in TDD System

DL/UL subframe configurations are different according to a UL-DL configuration in the TDD system. Therefore, the transmission timings of a PUSCH and a PHICH are different according to a UL-DL configuration. The transmission timings of a PUSCH and a PHICH may be different according to the index (or number) of a subframe.

In the LTE system, a UL/DL timing relationship among a PUSCH, a PDCCH that preceding the PUSCH, and a PHICH for transmission of DL HARQ ACK/NACK corresponding to the PUSCH is predetermined.

Table 7 below shows the transmission timings of a PDCCH and a PUSCH associated with the PDCCH for each UL-DL configuration.

TABLE 7

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | 4 | | | | | 4 | | |
| 3 | 4 | | | | | | | 4 | 4 | |
| 4 | | | | | | | | 4 | 4 | |
| 5 | | | | | | | | 4 | | |
| 6 | | 7 | 7 | | | | 7 | 7 | | 5 |

Referring to Table 7 above, in UL-DL configuration 1 to UL-DL configuration 6, for retransmission after receiving a UL grant on a PDCCH or receiving a PHICH from an eNB in an $n^{th}$ DL subframe, the UE transmits a PUSCH in an $(n+k)^{th}$ UL subframe according to the index of the DL subframe carrying the PDCCH (or the PHICH). Herein, k values are listed in Table 7 above.

In the case of UL-DL configuration 0, a PUSCH is transmitted in a UL subframe indicated in Table 7 above, in an $(n+7)^{th}$ UL subframe, or both, according to UL indexes set in a UL DCI format, the index of a DL subframe carrying a PHICH, and $I_{PHICH}$ received by higher-layer signaling or determined by the index of a UL subframe carrying a PUSCH.

Figure 8:
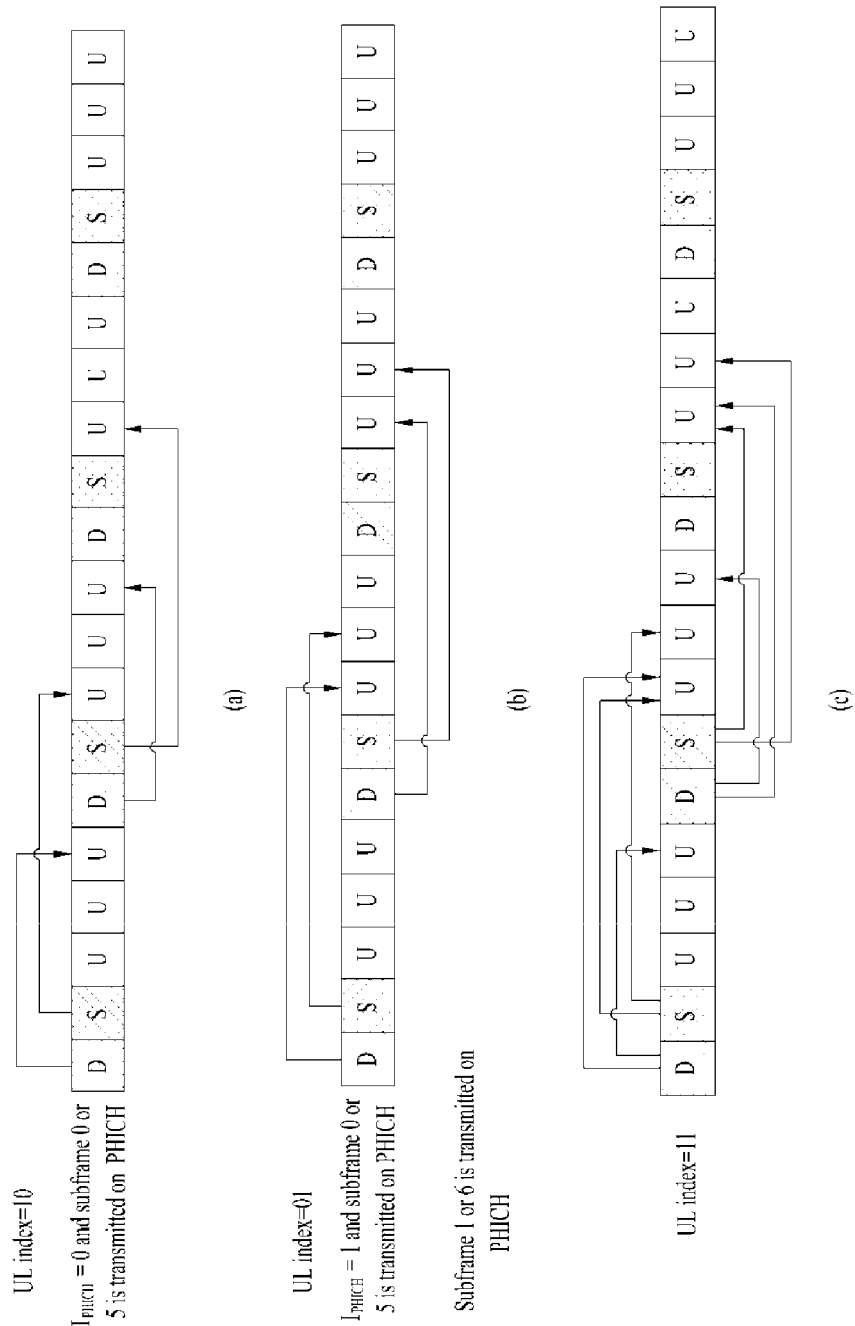
FIG. 8 is an example in which a UE transmits a PUSCH in a time division duplex (TDD) system.

FIG. 8 is an example in which a UE transmits a PUSCH in a TDD system.

FIG. 8(a) illustrates an example of transmission time of a PUSCH when a UL index is 10 or a PHICH is transmitted via $0^{th}$ DL subframe or a fifth DL subframe and $I_{PHICH}$ is 0.

FIG. 8(b) illustrates an example of a PUSCH when a UL index is 01 or a PHICH is transmitted via a $0^{th}$ DL subframe or a fifth DL subframe and $I_{PHICH}$ is 1 or a PHICH is transmitted via a first or sixth downlink subframe.

FIG. 8(c) illustrates an example in which the number of UL indexes is 11. In this case, UL grant in each DCI format can simultaneously determine two PUSCHs.

When a UE receives a PHICH containing HARQ ACK/NACK from a BS in a DL subframe i, the corresponding PHICH corresponds to a PUSCH transmitted from the UE in an uplink subframe i–k. In this case, k is shown in Table 8 below.

Table 8 below shows a transmission timing relationship between a PUSCH and a PHICH corresponding thereto according to a UL-DL configuration.

TABLE 8

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | 6 | | | | | 6 | | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

In the case of UL-DL configuration 1-6 or UL-DL configuration 0 and $I_{PHICH}=0$, when the UE receives a PHICH for transmission of HARQ-ACK from the BS in a subframe i, the PHICH corresponds to a PUSCH transmitted from the UE in a subframe i–k. On the other hand, in case of UL-DL configuration 0 and $I_{PHICH}=1$, when the UE receives a PHICH for transmission of HARQ-ACK from the BS in a subframe i, the PHICH may correspond to a PUSCH transmitted from the UE in a subframe i–6.

When the UE transmits a transport block via a PUSCH subframe corresponding to DL subframe i to the BS and then receives a PHICH corresponding to the transport block in a DL subframe i to decode ACK or when the transport block is disabled by a PDCCH transmitted in a downlink subframe i, the UE transmits ACK corresponding to the transport block to an upper layer. Otherwise, the UE transmits NACK corresponding to the transport block to the upper layer.

From a UE point of view, an ACK/NACK response (or a PHICH) to UL transmission on a PUSCH of the UE in an nth UL subframe is transmitted from the BS according to a corresponding UL subframe index in an $(n+k)^{th}$ DL subframe corresponding thereto. In case of subframe bundling, a corresponding PHICH corresponds to a last subframe of a bundle. The UE expects that a PHICH response to a PUSCH transmitted from the UE in the $(n+k)^{th}$ DL subframe is transmitted from the BS and needs to search for/detect/decode the corresponding PHICH. In this case, k is shown in Table 9 below.

Table 9 below shows a transmission timing relationship between a PUSCH and a PHICH corresponding thereto according to a UL-DL configuration.

TABLE 9

| TDD UL/DL Configuration | subframe index n |   |   |   |   |   |   |   |   |   |
|---|---|---|---|---|---|---|---|---|---|---|
|   | 0 | 1 | 2 | 3 | 4 | 5 | 6 | 7 | 8 | 9 |
| 0 |   |   | 4 | 7 | 6 |   |   | 4 | 7 | 6 |
| 1 |   |   | 4 | 6 |   |   |   | 4 | 6 |   |
| 2 |   |   | 6 |   |   |   |   | 6 |   |   |
| 3 |   |   | 6 | 6 | 6 |   |   |   |   |   |
| 4 |   |   | 6 | 6 |   |   |   |   |   |   |
| 5 |   |   | 6 |   |   |   |   |   |   |   |
| 6 |   |   | 4 | 6 | 6 |   |   | 4 | 7 |   |

PHICH resources are identified by an index pair such as $(n_{PHICH}^{group}, n_{PHICH}^{seq})$. $n_{PHICH}^{group}$ is a PHICH group number and $n_{PHICH}^{seq}$ is an orthogonal sequence index in the corresponding PHICH group. $n_{PHICH}^{group}$ and $n_{PHICH}^{seq}$ may be obtained according to Expression 3 below.

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA} / N_{PHICH}^{group} \rfloor + n_{DMRS}) \bmod 2N_{SF}^{PHICH}$$

[Expression 3]

Here, $n_{DMRS}$ is mapped from cyclic shift for a demodulation reference signal (DMRS) field on a latest PDCCH having UL DCI format for a transport block associated with the corresponding PUSCH transmission. On the other hand, when a PDCCH having a UL DCI format for the same transport block is not present, if an initial PUSCH for the same transport block is semi-persistently scheduled or scheduled by a random access response acknowledgement signal, $n_{DMRS}$ is set to 0.

$N_{SF}^{PHICH}$ is an amplitude of a spreading factor used for PHICH modulation.

$I_{PRB\_RA}$ is the same as $I_{PRB\_RA}^{lowest\_index}$ in case of a first transport block of a PUSCH associated with a PDCCH or in absence of a related PDCCH when the manually recognized number of transport blocks is not the same as the number of transport blocks indicated by a latest PDCCH associated with the corresponding PUSCH. On the other hand, in case of a second transport block of the PUSCH associated with the PDCCH, $I_{PRB\_RA}$ is the same as $I_{PRB\_RA}^{lowest\_index}+1$. Here, $I_{PRB\_RA}^{lowest\_index}$ corresponds to a lowest PRB index of a first slot of the corresponding PUSCH.

$N_{PHICH}^{group}$ is a number of a PHICH group configured by an upper layer.

$I_{PHICH}$ is 1 when a PUSCH is transmitted at a subframe index 4 or 9 in UL-DL configuration 0 in a TDD system. Otherwise, $I_{PHICH}$ is 0.

Table 10 below shows a mapping relationship between $n_{DMRS}$ and cyclic shift for a DMRS field used to determine PHICH resources in a PDCCH having a UL DCI format.

TABLE 10

| Cyclic Shift for DMRS Field in PDCCH with uplink DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

4. Configuration of Multiple PCells or Multiple Cell Groups in TDD System in Multiple Cell Environment LTE-A Release-10 limits that the same UL-DL configuration between cells is used in a TDD system. That is, LTE-A Release-10 is designed by assuming that the same UL-DL configuration between adjacent BSs is used.

Even if considering a synchronized network in which timing between adjacent BSs is synchronized with each other, when different UL-DL configurations are used between adjacent BSs, a DL signal of a specific BS and a UL signal of a specific UE, transmitted to an adjacent BS, may collide with each other. That is, there may be a UE that receives a DL signal from a BS A in a cell edge region and a UE that transmits a UL signal to a BS B at a region adjacent to the cell edge region. In this regard, the UEs may interfere with each other due to different UL-DL configurations between the BSs A and B.

UL-DL configuration defined by LTE-A Release-10 and a ratio of subframes in UL and DL according to UL-DL configuration are shown in Table 11 below.

TABLE 11

| Uplink-downlink configuration | Ratio (D + S:U) (D:U) | Downlink-to-Uplink Switch-point periodicity | Subframe number |   |   |   |   |   |   |   |   |   |
|---|---|---|---|---|---|---|---|---|---|---|---|---|
|   |   |   | 0 | 1 | 2 | 3 | 4 | 5 | 6 | 7 | 8 | 9 |
| 0 | 4:6 (1:3) | 5 ms | D | S | U | U | U | D | S | U | U | U |
| 1 | 6:4 (2:2) | 5 ms | D | S | U | U | D | D | S | U | U | D |
| 2 | 8:2 (3:1) | 5 ms | D | S | U | D | D | D | S | U | D | D |
| 3 | 7:3 (6:3) | 10 ms | D | S | U | U | U | D | D | D | D | D |
| 4 | 8:2 (7:2) | 10 ms | D | S | U | U | D | D | D | D | D | D |
| 5 | 9:1 (8:1) | 10 ms | D | S | U | D | D | D | D | D | D | D |
| 6 | 5:5 (3:5) | 5 ms | D | S | U | U | U | D | S | U | U | D |

However, when the same UL-DL configuration is used between adjacent BSs, flexibility of resource management decreases. That is, when different UL-DL configurations are used based on a traffic amount between a plurality of BSs, it may be possible to more flexibly and actively manage resources. That is, as shown in Table 11 above, since the number of UL subframes and DL subframes is changed according to UL-DL configuration, it is possible to flexibly manage resources in consideration of this. For example, when UEs in a specific BS require a higher number of UL resources while the same UL-DL configuration is used in all BSs, the BS may change a UL-DL configuration to a UL-DL configuration with a higher number of UL subframes to perform a communication service with a higher number of UL resources. As another example, when the same UL-DL configuration is used in all BSs, if the number of UEs that requires communication in a specific BS decreases in a time duration when the call volume is very low, like at dawn, a BS may change a UL-DL configuration to a UL-DL configuration with a higher number of UL subframes to reduce unnecessary DL transmission (e.g., a synchronization signal, an RS, a broadcasting channel, etc.), thereby achieving power saving of the BS.

This is the same as in a multiple cell environment. In the multiple cell environment, when the same UL-DL configuration between cells is used, flexibility of resource management of a BS also decreases. That is, when different UL-DL configurations are used based on a traffic amount between a plurality of cells, it may be possible to more flexibly and actively manage resources. For example, when UEs in a specific BS require a higher number of UL resources while all cells use the same UL-DL configuration, a UL-DL configuration of one or more specific cell is changed to a UL-DL configuration with a higher number of UL subframes such that a communication service is performed with a higher number of UL resources. As another example, when the same UL-DL configuration is used in all cells, if the number of UEs that requires communication in a specific BS decreases in a time duration when the call volume is very low, like at dawn, the BS may change a UL-DL configuration of one or more specific cell to a UL-DL configuration with a higher number of UL subframes to reduce unnecessary DL transmission (e.g., a synchronization signal, an RS, a broadcasting channel, etc.), thereby achieving power saving of the BS. In particular, in the inter-band multiple cell environment, different UL transmitting timings between cells may be required and a UE may use a plurality of RF ends in order to perform communication. In case of the inter-band multiple cell environment, UL-DL configurations may be different according to each RF end without interference between cells.

Due to the above reasons, for example, LTE-A Release-11 may support different UL-DL configurations between BS s and/or cells (component carriers or frequency bands) in the multiple cell environment.

However, when UL-DL configurations between cells are different, problems may arise during feedback of an ACK/NACK signal.

Figure 9:
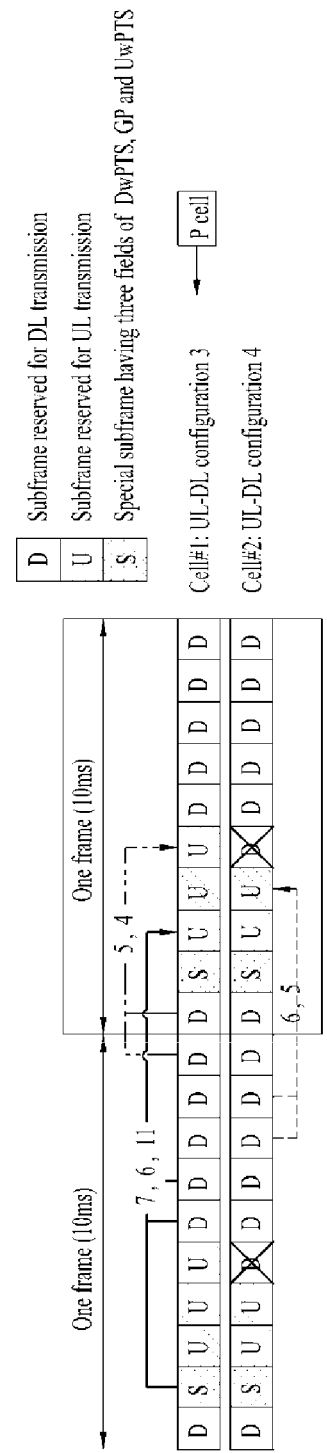
FIG. 9 is a diagram of an example of feedback of an ACK/NACK signal when a TDD system for supporting a multiple cell environment has different UL-DL configurations.

FIG. 9 is a diagram of an example of feedback of an ACK/NACK signal when a TDD system for supporting a multiple cell environment has different UL-DL configurations. In FIG. 9, it is assumed that a cell #1 as a P cell uses a UL-DL configuration 3 and a cell #2 as an S cell uses a UL-DL configuration 4. In addition, it is assumed that feedback of ACK/NACK is transmitted to a PUCCH of the P cell and operates according to a UL-DL configuration of the P cell. In addition, it is assumed that a frame of each cell has an index of 0 to 9.

Referring to FIG. 9, ACK/NACK signals of previous $7^{th}$, $6^{th}$, and $11^{th}$ DL subframes (or special subframes) of two cells may be multiplexed or bundled and transmitted on a PUCCH in a first UL subframe (index 2) of the P cell in a second frame. ACK/NACK signals of previous $6^{th}$ and $5^{th}$ DL subframes of two cells may be multiplexed or bundled and transmitted on a PUCCH in a second UL subframe (index 3) of the P cell. In addition, ACK/NACK signals of previous $5^{th}$ and $4^{th}$ DL subframes of the two cells may be multiplexed or bundled and transmitted on a PUCCH in a third UL subframe (index 4) of the P cell. However, in this case, problems may arise. A time domain corresponding to a third UL subframe of the P cell in a frame corresponds to a DL subframe region of the S cell. As a result, a region for ACK/NACK feedback for this region (the DL subframe) is not defined. That is, in FIG. 9, ACK/NACK feedback for a third DL subframe (index 4) in addition to a special subframe of the S cell (a cell #2) is omitted.

Thus far, for convenience of description, problems in terms of ACK/NACK feedback have been described. However, these problems arise in terms of transmission of channel state information (CSI) as well as ACK/NACK. Here, the CSI includes channel quality indicator (CQI), crank indication (RI), precoding matrix indicator (PMI), precoding type indicator (PTI), etc.

In addition, in the inter-band multiple cell environment, due to different frequency properties between inter-bands, propagation or path delay, a fading channel, and propagation or path loss may be changed. Thus, a UE may need different configurations of reception and transmission time between inter-bands and different configurations of transmission power. In particular, when UL transmission timings between cells of the UE are different, transmission time may be restricted due to different timings. For example, in an FDD system, an ACK/NACK response to a PDSCH transmitted together with a PDCCH in an $n^{th}$ DL subframe is transmitted on a PUCCH of an $(n+4)^{th}$ UL subframe. Here, assuming that the length of a subframe is 1 ms, an interval between ACK/NACK responses is designed by considering that processing time for demodulating a PDSCH and generating ACK/NACK by a UE is about 3 ms (or 3 ms−(2*delay time)). In an FDD situation containing 2 cells, assuming that a frame boundary of a DL CC of a P cell in a specific UE is received prior to a frame boundary of a DL CC of an S cell, when an ACK/NACK feedback process is performed based on time of the P cell, there is no problem to respond to a signal received in an $n^{th}$ subframe in an $(n+4)^{th}$ subframe based on the P cell. However, with regard to the S cell, since an $n^{th}$ subframe is received after an $n^{th}$ subframe of the P cell, time required to process a response in the $(n+4)^{th}$ subframe of the P cell may be insufficient.

In order to overcome this problem, LTE-A Release-10 may use multiple P cells (or a multiple cell group) unlike in a case in which only one P is present. That is, a specific UE may have one or more P cell (or a cell group) and ACK/NACK or CSI may be fed back using a PUCCH for the ACK/NACK or the CSI according to each P cell (or a cell group). In this case, the number of P cells (or cell groups) of a specific UE may be equal to or less than a total number of cells configured for the corresponding UE. Here, control information may be transmitted per each group using a conventional LTE-A Release-10 method. A method of managing one or more P cells (or cell groups) will be described below.

4.1. First Method of Configuring Multiple P Cells or Multiple Cell Group

A UE may have one or more (x) (e.g., x=2) P cells. In this case, the number (x) of P cells configured for the UE may be predetermined, indicated via signaling (e.g., RRC signaling)

of a BS, or configured according to a predetermined rule (e.g., the number of cells configured for the UE, the number of inter-bands, etc.).

Likewise, when a plurality of P cells is present, the plural P cells may have different UL-DL configurations. Here, the case of one or more P cells corresponds to a case in which one or more P cells and one or more S cells are present in DL CC only while using one conventional P cell and one or more S cells UL CC. In addition, the case may correspond to a case in which one or more P cells and one or more S cells are present in UL CC only while using one conventional P cell and one or more S cells in DL CC or a case in which one or more P cells and one or more S cells are simultaneously present in DL CC and UL CC.

The UE may have one or more S cells associated with a plurality of P cells configured for the UE. However, an S cell associated with a P cell may not be present. Here, the P cell is based for UL control information (UCI) feedback of cells and has a DL association set index K (K has $\{k_0, k_1, \ldots k_{M-1}\}$) for a TDD system. Alternatively, the P cell refers to a cell as a reference of M indicated by the size of a bundling window associated with K and/or a cell in which a PUCCH is present. One or more S cells associated with the P cell refer to a cell that is grouped together with the P cell and operates. That is, UCI of the associated P cells and S cells is bonded and is fed back on one PUCCH. In this case, the associated P cells and S cells may be positioned in the same band (potentially same RF).

When one or more S cells associated with a specific P cell are bonded to one cell group, all cells belonging to one cell group may have the same UL-DL configuration. This formation and configuration of the cell group is logical meaning and in reality may not mean generation of a physical group. In addition, when an S cell associated with the P cell is not present, the cell group may be configured by the P cell only. That is, the UE may have one or more cell groups and each cell group may include one P cell. In addition, when the S cell associated with the P cell is present, each cell group may include one P cell. However, when the S cell associated with the P cell is not present, each cell group does not include a P cell.

The UE may perform ACK/NACK feedback, CSI report, SRS transmission, or the like on a PUCCH in a P cell of each cell group with respect to one or more cell group. As described above, each cell belonging to the same cell group is configured to have the same UL-DL configuration and thus the aforementioned problem in a conventional art dose not arise in a cell group. In addition, different RF ends between the aforementioned cell groups may be required.

When the first method of configuring a multiple P cell or a multiple cell is applied, cells in each cell group may correspond to an intra-band multiple environment and an environment between cell groups may correspond to an inter-band multiple cell environment. In addition, some cells of the inter-band multiple cell environment may constitute different cell groups and the remaining cells may constitute other one cell group. In this case, the number of P cells of a specific UE may be equal to or less than a total number of inter-bands configured for the corresponding UE.

The number of P cells (or the number of cell groups) may be configured to be equal to or less than a maximum value of an inter-band used in a system or a UE. In addition, the number of P cells (or the number of cell groups) may be determined as the number of groups obtained by calculating a difference in UL transmission timing (or timing advance (TA)) with a P cell and grouping serving cells configured to have the calculated difference greater than a predetermined value based on UL-DL configuration.

4.2. Second Method of Configuring Multiple P Cells or Multiple Cell Group

A UE may support a specific number of less (x) (e.g., x=2) different UL-DL configurations only. In this case, the number (x) of P cells configured for the UE may be predetermined, indicated via signaling (e.g., RRC signaling) of a BS, or configured according to a predetermined rule (e.g., the number of cells configured for the UE, the number of inter-bands, etc.). The number of UL-DL configurations configured for the UE may vary per UE and may be the same in all UEs. In addition, a BS may configure only a cell that uses only a specific number (x) or less different UL-DL configurations for the corresponding UE. For example, when the number x is the same in all UEs and is 2, the BS may configure a cell using two different UL-DL configurations only.

The UE indicates or is allocated a configured serving cell from the BS. In this case, UL-DL configuration may differ per cell and only x or less different UL-DL configuration may be present. The UE may group cells having the same UL-DL configuration among serving cells configured from the BS to a cell group. In this case, only x or less different UL-DL configurations are present and thus x or less cell groups may be generated. This formation and configuration of the cell group is logical meaning and in reality may not mean generation of a physical group. That is, the cell group may have different UL-DL configurations and may be configured by one or more cells.

One specific cell per cell group formed or configured through the aforementioned method is configured as a P cell in a cell group. In this case, the P cell may be indicated via signaling of a BS or configured by the UE according to a predetermined rule. For example, a cell with a lowest cell ID per cell group may be configured as a P cell in the corresponding cell group.

The UE may perform ACK/NACK feedback, CSI report, SRS transmission, or the like on a PUCCH in a P cell of each cell group with respect to one or more cell group. As described above, each cell belonging to the same cell group is configured to have the same UL-DL configuration and thus the aforementioned problem in a conventional art dose not arise in a cell group. In addition, different RF ends between the aforementioned cell groups may be required.

When the first method of configuring a multiple P cell or a multiple cell is applied, cells in each cell group may correspond to an intra-band multiple environment and an environment between cell groups may correspond to an inter-band multiple cell environment. In addition, some cells of the inter-band multiple cell environment may constitute different cell groups and the remaining cells may constitute other one cell group. In this case, the number of P cells of a specific UE may be equal to or less than a total number of inter-bands configured for the corresponding UE.

As described above, the number of P cells (or the number of cell groups) may be configured to be equal to or less than a maximum value of an inter-band used in a system or a UE. In addition, the number of P cells (or the number of cells groups) may be determined as the number of serving cell groups configured to have a difference in UL transmission timing (or timing advance (TA)), greater than a predetermined value.

4.3. Example of Application of Multiple P Cell or Multiple Cell Group Configuration The methods of configuring multiple P cells or multiple cell group described in (4.1.) or (4.2) can be applied as follows.

Figure 10:
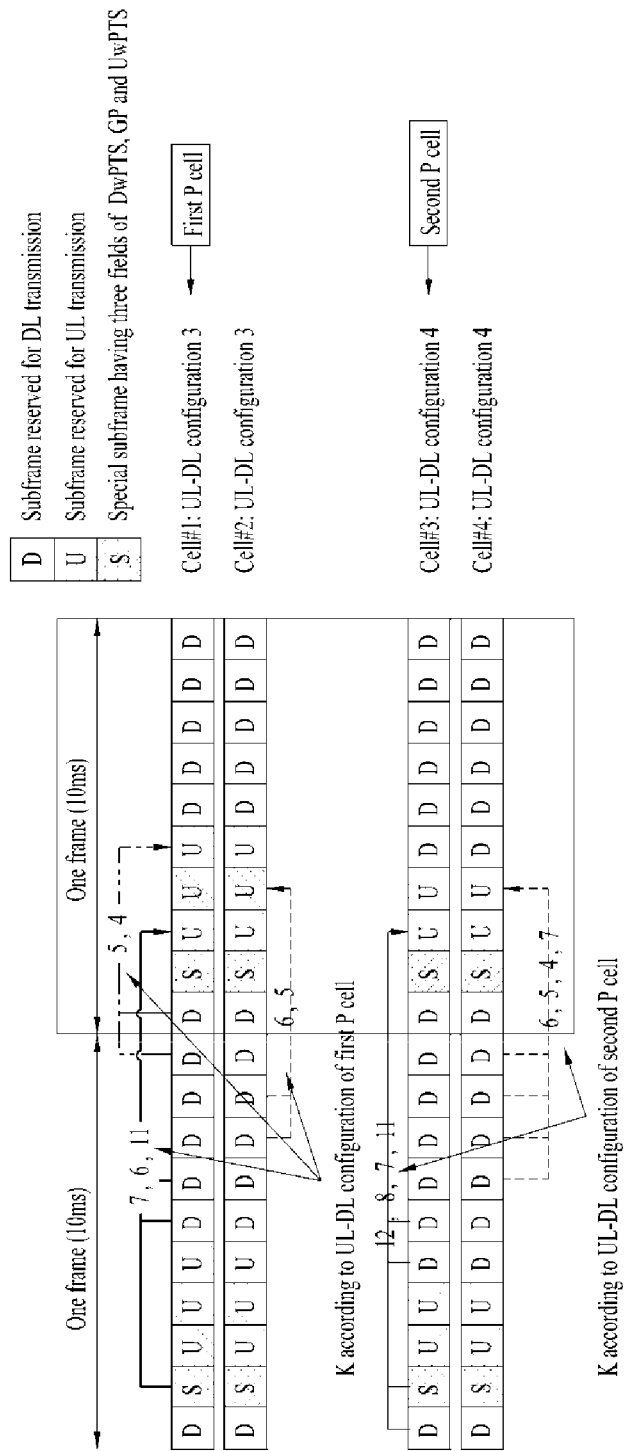
FIG. 10 is an example of configuring a multiple P cell or a multiple cell group according to an embodiment of the present invention.

FIG. 10 is an example of configuring a multiple P cell or a multiple cell group according to an embodiment of the present invention. Hereinafter, it is assumed that four configured serving cells are present, an intra-band multiple cell is present between two configured serving cells (a cell #1 and a cell #2) and two different configured serving cells (a cell #3 and a cell #4), and inter-band multiple cells, frequencies of which are spaced apart from each other, are configured between intra-band multiple cells.

Referring to FIG. 10, each intra-band multiple cell is configured as one cell group. That is, the cell #1 and the cell #2 may be configured as one cell group and the cell #3 and the cell #4 may be configured as another cell group. In addition, a cell having a lower cell ID in each cell group may be used as a P cell. In this case, as described above, the P cell may be determined via signaling of the BS or according to a predetermined rule.

The cell #1 and the cell #2 as an intra-band multiple cell use the same UL-DL configuration (3 in FIG. 10) and the cell #3 and the cell #4 as another intra-band multiple cell also use the same UL-DL configuration (4 in FIG. 10). That is, in a UE having a plurality of configured serving cells, different UL-DL configurations are present. However, according to a configuration of a cell group of cells using the same UL-DL configuration, conventional technologies such as ACK/NACK feedback, CSI report, SRS transmission, and the like per cell group may be applied.

5. Cross Cell Scheduling Between Multiple P Cells or Multiple Cell Groups in TDD System in Multiple Cell Environment As described above, cross cell scheduling may be performed UE-specifically in order to prevent interference or effectively manage resources in a multiple cell environment. The cross cell scheduling is a method of transmitting UL/DL grant information from one cell (hereinafter a scheduling cell) to another cell (hereinafter, a scheduled cell). The scheduling cell is used to transmit PDCCH information including the UL/DL grant of the scheduled cell and to transmit a PHICH corresponding to a PUSCH of the scheduled cell when cross cell scheduling is supported with respect to the scheduled cell. The scheduled cell is used to transmit a PUSCH corresponding to a PDCCH through the scheduling cell and to retransmit a PUSCH corresponding to a PHICH of the scheduling cell. Here, the scheduling cell may be the aforementioned P cell and any one of a plurality of S cells when a plurality of S cells is configured for the UE. However, the scheduled cell may be an S cell configured for the UE but may not be a P cell. The scheduling cell may use a CIF value of a DCI format in order to differentiate PDCCH information including UL/DL grant of the scheduled cell and PDCCH information including UL/DL grant of the scheduling cell. Likewise, when the cross cell scheduling is performed, HARQ-ACK information of the PDSCH/PUSCH scheduled as the corresponding UL/DL grant is transmitted through the scheduling cell only.

Figure 11:
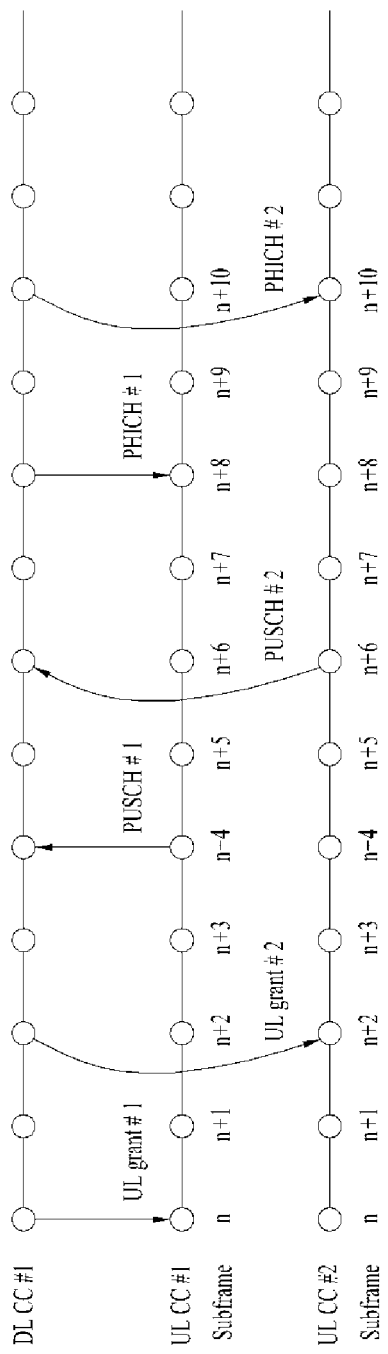
FIG. 11 is a diagram illustrating transmitting time of UL grant, a PUSCH, and a PHICH in an FDD system in a multiple cell environment.

FIG. 11 is a diagram illustrating transmitting time of UL grant, a PUSCH, and a PHICH in an FDD system in a multiple cell environment.

Referring to FIG. 11, in a multiple cell environment, when a specific UE receives UL grant in an nth DL subframe of DL CC #1, the UE transmits a PUSCH in an $(n+4)^{th}$ UL subframe of corresponding UL CC #1. In addition, when the PUSCH is transmitted in the $(n+4)^{th}$ UL subframe, a PHICH as an ACK/NACK response to the corresponding PUSCH in a corresponding $(n+8)^{th}$ DL subframe is transmitted via DL CC#1 from the BS.

In addition, when a specific UE receives UL grant in an $(n+2)^{th}$ DL subframe of DL CC #1 via cross cell scheduling, the UE transmits a PUSCH in an $(n+6)^{th}$ UL subframe of corresponding UL CC #2. In addition, when a PUSCH is transmitted in an (n+6)th UL subframe, a PHICH as an ACK/NACK response to a corresponding PUSCH in a corresponding $(n+10)^{th}$ DL subframe is transmitted via DL CC#1 from the BS. That is, the UE expects that a PUSCH is transmitted via the scheduled cell in an $(n+6)^{th}$ UL subframe with respect to UL grant received in an $(n+2)^{th}$ DL subframe via the scheduling cell and that a PHICH response to the PUSCH transmitted from the UE in an $(n+10)^{th}$ DL subframe is transmitted from the BS via the scheduling cell and needs to search for/detect/demodulate the PHICH.

However, as described above, since a TDD system for supporting a conventional multiple cell environment considers only use of the same UL-DL configuration in cells, it is sufficient to transmit a PUSCH and a PHICH according to UL/DL scheduling in the aforementioned TDD system and thus transmission time of each PUSCH and PHICH is not vague during cross cell scheduling. However, when the same UL-DL configuration is used, resources cannot be appropriately managed in consideration of UL or DL traffic per cell, thereby reducing cell throughput. Thus, in order to increase cell throughput, a scheme for effective data transmission using different UL-DL configurations for respective cells has been considered.

When respective cells have different UL-DL configurations and support cross cell scheduling, problems may arise in terms of PUSCH or PHICH transmission time due to presence of a collision subframe between DL of one cell and UL of another cell. The collision subframe is configured in such a way that one cell includes a DL subframe and another cell includes a UL subframe among cells at the same point of time. The collision subframe can be applied to a case in which a plurality of S cells are configured for the UE as well as a case in which one S cell is configured per UE.

Figure 12:
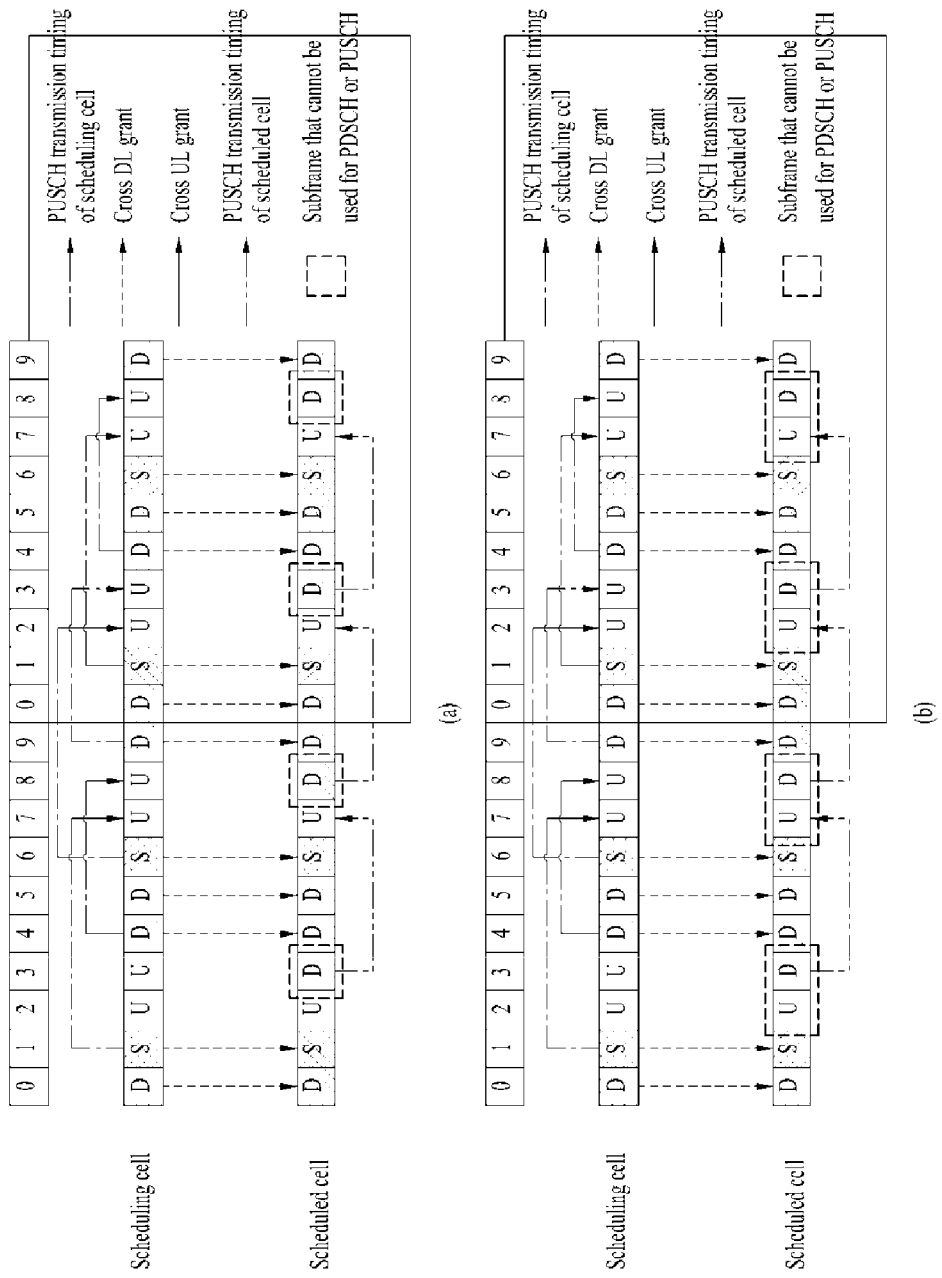
FIG. 12 is a diagram of an example of cross cell scheduling when a TDD system for supporting a multiple cell environment has different UL-DL configurations.

FIG. 12 is a diagram of an example of cross cell scheduling when a TDD system for supporting a multiple cell environment has different UL-DL configurations.

FIG. 12(a) illustrates a case in which PUSCH transmission time of the scheduled cell is calculated based on PUSCH transmission time of UL grant of the scheduling cell. FIG. 12(b) illustrates a case in which PUSCH transmission time of the scheduled cell is calculated based on PUSCH transmission time of UL grant of the scheduled cell.

Referring to FIG. 12(a), UL grant of third and eighth UL subframes (which have indexes 2 and 7) of each radio frame of the scheduled cell may be transmitted in seventh and second DL subframes (which have indexes 6 and 1) of each radio frame of the scheduling cell. However, the scheduling cell cannot transmit DL grant of fourth and ninth DL subframes (which have indexes 3 and 8) of each radio frames of the scheduled cell, which restricts cross cell scheduling or PDSCH transmission to reduce cell efficiency.

Referring to FIG. 12(b), the scheduling cell is configured by UL subframes and thus cannot transmit UL grant at a point of time for transmitting UL grant of third and eighth UL subframes (which have indexes 2 and 7) of each radio frame of the scheduled cell, and the scheduling cell cannot transmit DL grant of fourth and ninth DL subframes (which have indexes 3 and 8) of each radio frame of the scheduled cell, which restricts cross cell scheduling or PDSCH and PUSCH transmission to reduce cell efficiency.

Accordingly, irrespective of a cell as a reference for determination of PUSCH transmission time, the aforementioned problems may arise when UL-DL configurations are different. As the number of S cells configured in one UE increase, the problems are more serious.

In order to overcome the problems that may arise due to different UL-DL configurations in respective cells, a cross cell scheduling method in a system for supporting a multiple P cell or a multiple cell group is proposed.

5.1. Cross Cell Scheduling Restriction Between Cells Belonging to Different Cell Groups According to an embodiment of the present invention, cross cell scheduling between cells belonging to the same cell group is permitted but cross cell scheduling between cells belonging to different cell groups is not permitted. That is, the scheduling cell may be a P cell or S cell in one cell group and the scheduled cell may be an S cell in the same cell group as a cell group to which the scheduling cell belongs.

As described above, since all cells in the same cell group use the same UL-DL configuration in the multiple P cell or multiple cell group environment, a problem may not arise during cross cell scheduling in the same cell group.

Figure 13:
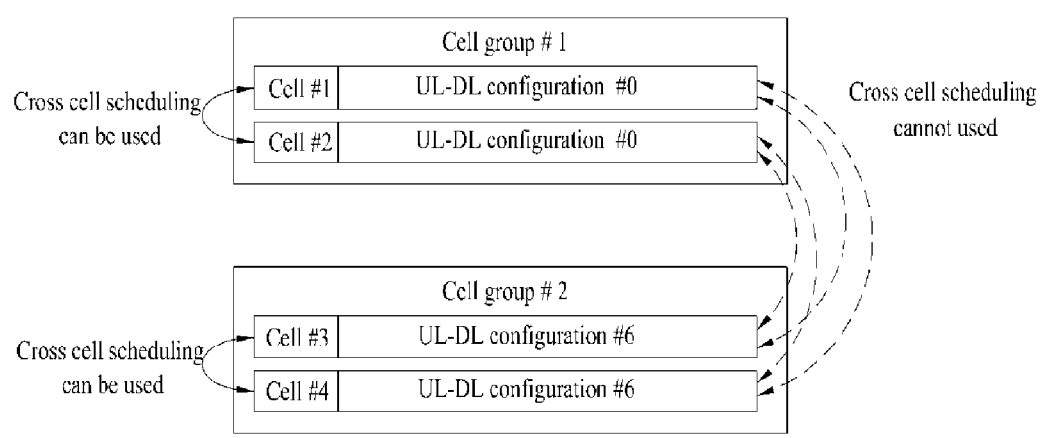
FIG. 13 is a schematic diagram illustrating a cross cell scheduling method in a system for supporting a multiple P cell or a multiple cell group, according to an embodiment of the present invention.

FIG. 13 is a schematic diagram illustrating a cross cell scheduling method in a system for supporting a multiple P cell or a multiple cell group, according to an embodiment of the present invention.

Referring to FIG. 13, four configured serving cells are present. In this case, two configured serving cells (a cell #1 and a cell #2) belong to a cell group #1 and other two configured serving cells (a cell #3 and a cell #4) belong to cell group #2. In addition, cells belonging to the cell group #1 may use a UL-DL configuration #0 and cells belonging to the cell group #2 may use a UL-DL configuration #6. That is, cross cell scheduling between the cell #1 and the cell #2 belonging to the cell group #1 is permitted and cross cell scheduling between the cell #3 and the cell #4 belonging to the cell group #2 is permitted. On the other hand, cross cell scheduling between cells (the cell #1 and the cell #2) of the cell group #1 and cells (the cell #3 and the cell #4) of the cell group #2 is not permitted.

In this case, a UE may not expect cross cell scheduling between different cell groups and may perform cross cell scheduling in the same cell group only. That is, it may be assumed that the UE for which a multiple P cell or a multiple cell group is configured may be applied to only cells belonging to the same cell group.

In addition, a BS determines that cross cell scheduling between cells belonging to different cell groups is required in order to prevent interference or effectively manage resources or requests cross cell scheduling between cells belonging to different cell groups due to scheduling handling miss, the UE may not perform cross cell scheduling. When the UE detects errors or wrong information based on a PDCCH received from the BS and recognizes that cross cell scheduling between cells belonging to different cell groups, the UE may not perform cross cell scheduling or may discard the received PDCCH for cross cell scheduling. That is, when the UE detects inconsistent control information (cross scheduling information between different cell groups configured for the UE) or CIF information indicating different cell groups from the BS, the UE may discard the corresponding PDCCH.

5.2. Cross Cell Scheduling Restriction in Collision Subframe

Figure 14:
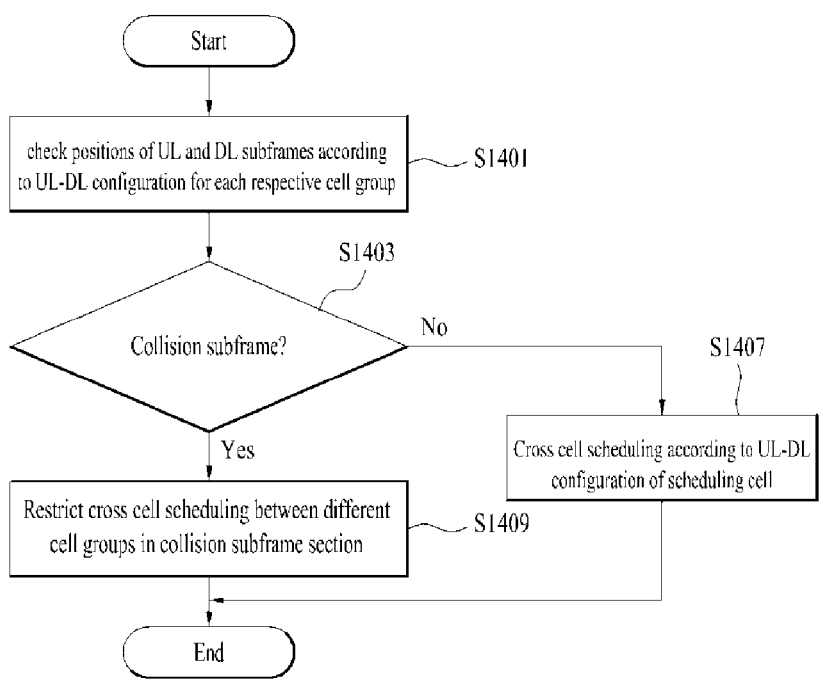
FIG. 14 is a diagram illustrating a cross cell scheduling method in a system for supporting a multiple P cell or a multiple cell group, according to an embodiment of the present invention.

FIG. 14 is a diagram illustrating a cross cell scheduling method in a system for supporting a multiple P cell or a multiple cell group, according to an embodiment of the present invention.

Referring to FIG. 14, in case of a UE for which a multiple P cell or a multiple cell group is configured, a BS checks positions of UL and DL subframes allocated (or reserved) to respective cell groups according to a cell group configured for the UE (S1401). As described above, since cells belonging to the same cell group have the same UL-DL configuration, the BS may check a UL-DL configuration of one cell of each cell group to check a UL-DL configuration of the corresponding cell group. In addition, this UL-DL configuration information as system information may be known to both the BS and the UE. The BS may transmit an index of the UL-DL configuration information to notify the UE of a UL-DL configuration per cell (or per cell group).

The BS that checks a position of a UL or DL subframe determined for each cell group may check whether a collision subframe between cells belonging to different cell groups is present (S1403). That is, the BS may check whether a DL subframe of one cell and a UL subframe belonging to another cell group are positioned together in the same time duration (or the same subframe index) and subframes of two cells collide with each other or a UL subframe of one cell and a DL subframe belonging to another cell group are positioned together in the same time duration (or the same subframe index) and subfrrames of two cells collide with each other.

In a step S1403, when the collision subframe is not present, the BS performs cross cell scheduling according to a UL-DL configuration of the scheduling cell (S1105). That is, the BS transmits a PDCCH of UL/DL grant of the scheduled cell via the scheduling cell and also transmits a PHICH of HARQ ACK/NACK corresponding to a PUSCH of the scheduled cell via the scheduling cell.

In this case, the BS may configure one cell (e.g., a cell with a lowest cell ID) as the scheduling cell and configure one or more cells belonging to a different group from the scheduling cell as the scheduled cell for cross cell scheduling. In addition, the BS may configure one or more cells belonging to a specific cell group as the scheduling cell. In this case, the BS may configure one or more scheduled cells that are associated with respective scheduling cells and belong to a different cell group from the scheduling cell.

In a step S1403, when the BS checks that the collision subframe is present, the BS performs cross cell scheduling restriction on data transmission and reception in a collision subframe section such that the data transmission and reception may not comply with cross cell scheduling according to a UL-DL configuration of a scheduling cell belonging to a different cell group from the aforementioned scheduled cell (S1107). That is, when DL transmission needs to be performed or UL transmission is performed in the collision subframe section, cross cell scheduling is restricted in a corresponding subframe only such that UL or DL is transmitted and received in a changed position (a cell or a subframe) and the cross cell scheduling is performed in the other subframes.

Likewise, assuming that cross cell scheduling between cells belonging different cell groups is not performed in the collision subframe section, a self-scheduling method may be applied. For example, when UL grant of a PUSCH of the scheduled cell is transmitted in the collision subframe section, the UL grant is transmitted via the corresponding scheduled cell. When a PHICH including HARQ ACK/NACK to a PUSCH of the scheduled cell is transmitted in the collision subframe section, the PHICH may also be transmitted via the corresponding scheduled cell. In this case, the UL grant, the PUSCH, or the PHICH may be transmitted based on transmission time according to UL-DL configuration of the scheduled cell. In addition, the BS may perform cross cell scheduling of the corresponding scheduled cell via another cell (e.g., a P cell of a corresponding cell group or an S cell with a lowest cell ID) belonging to the same cell group as the corresponding scheduled cell. That is, the method described in (5.1.1.) may be applied to the cross cell scheduling in the collision subframe section.

Hereinafter, an example in which the present embodiment is applied to a system for supporting a multiple P cell or a multiple cell group will be described.

Figure 15:
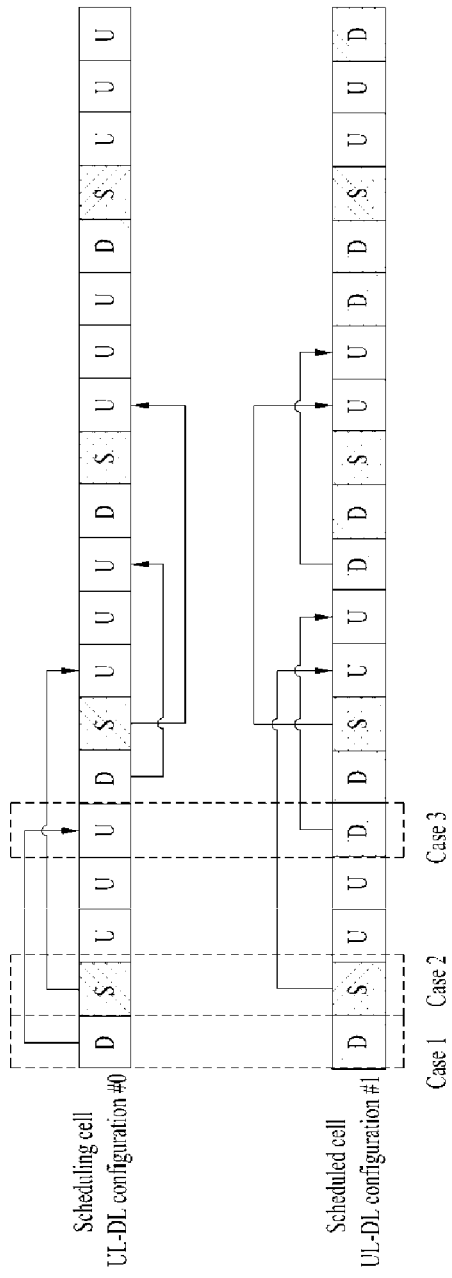
FIG. 15 is a diagram illustrating an example in which cross cell scheduling is performed on a plurality of cells with different UL-DL configurations.

FIG. 15 is a diagram illustrating an example in which cross cell scheduling is performed on a plurality of cells with different UL-DL configurations.

Referring to FIG. 15, when PUSCH transmission time is considered based on the scheduling cell, a UE receives UL grant of the scheduled cell via the scheduling cell for cross cell scheduling in a subframe section of a case 1 from a BS. Then the UE needs to transmit a PUSCH via the scheduled cell in a UL subframe section of a case 3. However, a DL subframe is present instead of a UL subframe in the corresponding PUSCH transmission section in the scheduled cell and thus the UE cannot transmit the PUSCH via the scheduled cell. In addition, the UE needs to receive DL/UL grant via the scheduling cell in a subframe section of the case 3. However, the scheduling cell is configured by a UL subframe and thus the UE cannot receive DL/UL grant of the scheduled cell through the scheduling cell from the BS.

Thus when PUSCH transmission of the scheduled cell needs to be performed by the UE in the collision subframe section or the UE needs to receive DL/UL grant of the scheduled cell in the collision subframe section, cross cell scheduling is restricted. The corresponding UE may receive DL/UL grant of the scheduled cell in the collision subframe section from the scheduled cell and the BS may transmit UL/DL grant of a PUSCH of the scheduled cell in the collision subframe section via the scheduled cell. In this case, the BS may transmit DL/UL grant via the scheduled cell based on transmission time according to a UL-DL configuration of the scheduled cell in the collision subframe section.

On the other hand, there is no problem during cross cell scheduling in a subframe section corresponding to a case 2. Thus, cross cell scheduling is performed such that the UE may receive UL grant of the scheduled cell from the scheduling cell in the subframe section corresponding to the case 2.

Figure 16:
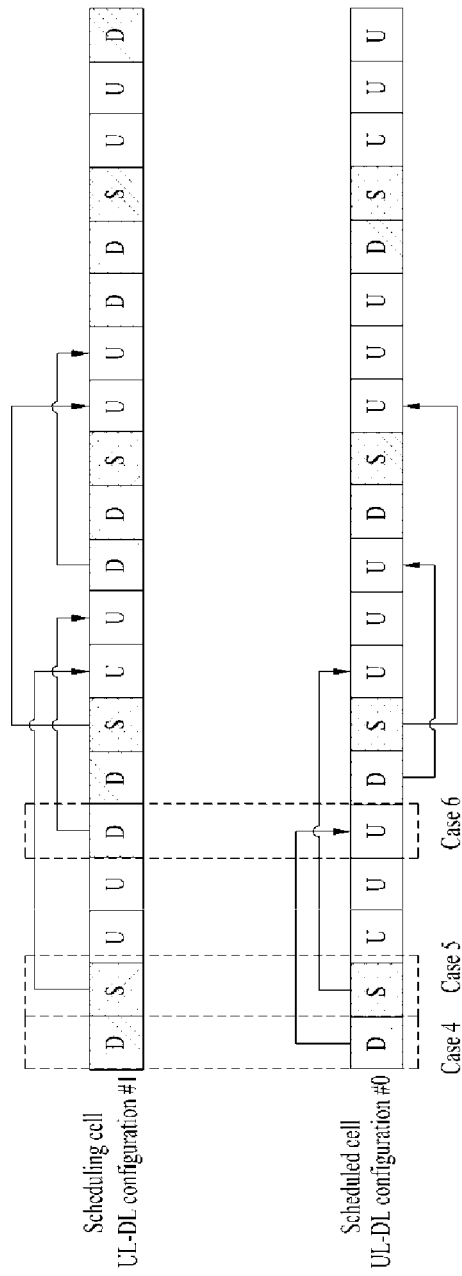
FIG. 16 is a diagram illustrating an example in which cross cell scheduling is performed on a plurality of cells with different UL-DL configurations.

FIG. 16 is a diagram illustrating an example in which cross cell scheduling is performed on a plurality of cells with different UL-DL configurations.

Referring to FIG. 16, although a UL subframe is present in the scheduled cell in the collision subframe section, a reference for UL grant or PUSCH transmission time for scheduling a corresponding UL subframe is not present in the scheduling cell and thus the case of FIG. 16 corresponding to a case in which cross cell scheduling cannot be performed. A reference for UL grant or PUSCH transmission time for transmission of a PUSCH in a subframe section of a case 6 is not present in a subframe section of the case 4 of the scheduling cell.

Thus, cross cell scheduling may be restricted in the corresponding subframe. The UE may receive UL grant of a PUSCH of the scheduled cell in the subframe section of the case 6 from the scheduled cell in the subframe section of the case 4. That is, the BS may transmit UL grant via the scheduled cell based on transmission time according to UL-DL configuration of the scheduled cell.

On the other hand, there is no problem during cross cell scheduling in a subframe section of a case 5 and thus cross cell scheduling is performed such that the UE may receive UL grant of the scheduled cell from the scheduling cell in the subframe section of the case 5.

In summary, when transmission time of UL/DL grant or transmission time of a PUSCH with respect to a plurality of cells belonging to different cell groups and having different UL-DL configurations correspond to a collision subframe, the corresponding UL/DL grant, UL grant of a corresponding PUSCH, and a corresponding PUSCH may be transmitted via the scheduled cell. In this case, the transmission timing of the UL/DL grant may comply with UL-DL configuration of the scheduled cell.

6. Overview of Device According to an Embodiment of the Present Invention

Figure 17:
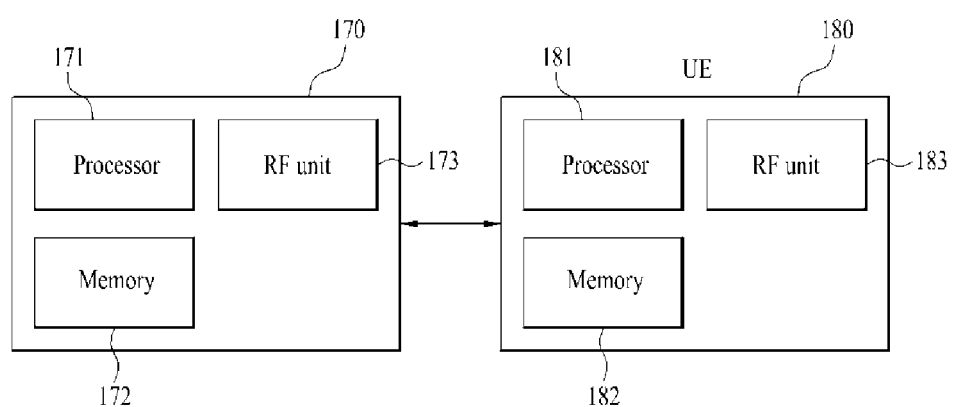
FIG. 17 is a block diagram of a communication device according to an embodiment of the present invention.

FIG. 17 is a block diagram of a communication device according to an embodiment of the present invention.

Referring to FIG. 17, a wireless communication system includes a BS 170 and a plurality of UEs 180 positioned in an area of the BS 170.

The BS 170 includes a processor 171, a memory 172, and a radio frequency (RF) unit 173. The processor 171 embodies the proposed functions, procedures, and/or methods. Layers of a wireless interface protocol may be embodied by the processor 171. The memory 172 is connected to the processor 171 and stores various information for driving the processor 171. The RF unit 173 is connected to the processor 171 and transmits and/or receives a radio signal.

The UE 180 includes a processor 181, a memory 182, and an RF unit 183. The processor 181 embodies the proposed functions, procedures, and/or methods. Layers of a wireless interface protocol may be embodied by the processor 181. The memory 182 is connected to the processor 181 and stores various information for driving the processor 181. The RF unit 183 is connected to the processor 181 and transmits and/or receives a radio signal.

The memories 172 and 182 may be inside or outside the processors 171 and 181 and connected to processors 171 and 181 via various well-known means. In addition, the BS 170 and/or the UE 180 may have a single antenna or a multiple antenna.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to various wireless access systems other than a 3rd generation partnership project (3GPP) long term evolution (LTE) system although the embodiments of the present invention have been described in terms of an example in which a data transmitting/receiving method is applied to the 3GPP LET system.

The invention claimed is:

1. A method of transmitting and receiving data in a time division duplex (TDD) for supporting multiple cells, the method performed by a base station and comprising:
    configuring cell groups, each of the cell groups comprises one or more cells with the same uplink-downlink (UL-DL) configuration, when a plurality of cells are configured for a user equipment (UE);
    performing cross cell scheduling on a second cell belonging to a different cell group from a first cell, via the first cell according to a UL-DL configuration of the first cell;
    checking whether a collision subframe in which a UL subframe and a DL subframe are simultaneously present occurs in a same time duration in the first cell and the second cell when performing the cross cell scheduling;
    performing a cross cell scheduling restriction on data transmission and reception in the collision subframe, when the collision subframe is present, wherein the cross cell scheduling is not performed on the collision subframe; and
    transmitting and receiving data to and from the UE, on the second cell in the collision subframe, while performing scheduling in the collision subframe via the second cell according to a UL-DL configuration of the second cell,
    wherein the cell groups configured for the UE are obtained by grouping cells having a difference of UL transmission timing with a specific cell configured for the UE greater than a preset value, based on a UL-DL configuration of the cells.

2. The method according to claim 1, wherein the transmitting and receiving comprises transmitting UL grant information of a physical uplink shared channel (PUSCH) according to the UL-DL configuration of the second cell via the second cell when reception of the PUSCH via the second cell is scheduled in the collision subframe.

3. The method according to claim 1, wherein the transmitting and receiving comprises transmitting UL or DL grant information to the UE via the second cell, when transmission of the UL or DL grant information via the first cell is scheduled in the collision subframe.

4. The method according to claim 1, wherein a number of cell groups configured for the UE is equal to or less than a number of inter-bands used in a system or the UE.

5. A base station (BS) for transmitting and receiving data in a time division duplex (TDD) for supporting multiple cells, the BS comprising:
    a radio frequency (RF) unit for transmitting and receiving a radio signal; and
    a processor for configuring cell groups each of the cell groups comprises one or more cells with the same uplink-downlink (UL-DL) configuration, when a plurality of cells are configured for a user equipment (UE), performing cross cell scheduling on a second cell belonging to a different cell group from a first cell via the first cell according to UL-DL configuration of the first cell, checking whether a collision subframe in which a UL subframe and a DL subframe are simultaneously present occurs in a same time duration in the first cell and the second cell when performing the cross cell scheduling, performing a cross cell scheduling restriction on data transmission and reception in the collision subframe, when the collision subframe is present wherein the cross cell scheduling is not performed on the collision subframe, and transmitting and receiving data to and from the UE, on the second cell in the collision subframe, while performing scheduling in the collision subframe via the second cell according to a UL-DL configuration of the second cell,
    wherein the cell groups configured for the UE are obtained by grouping cells having a difference of UL transmission timing with a specific cell configured for the UE greater than a preset value, based on a UL-DL configuration of the cells.

6. The BS according to claim 5, wherein the processor transmits UL grant information of a physical uplink shared channel (PUSCH) according to the UL-DL configuration of the second cell via the second cell when reception of the PUSCH via the second cell is scheduled in the collision subframe.

7. The BS according to claim 5, wherein the processor transmits UL or DL grant information to the UE via the second cell, when transmission of the UL or DL grant information via the first cell is scheduled in the collision subframe.

8. The BS according to claim 5, wherein a number of cell groups configured for the UE is equal to or less than a number of inter-bands used in a system or the UE.

* * * * *